US012678942B2

(12) United States Patent     (10) Patent No.:   US 12,678,942 B2

Ducharme et al.     (45) Date of Patent:    Jul. 14, 2026

(54) TOOL FOR PALLETIZING MIXED LOAD PRODUCTS, PALLETIZING ROBOT INCLUDING THE TOOL, AND METHOD THEREFOR

(71) Applicant: Symbotic Canada, ULC, Lafontaine Montreal (CA)

(72) Inventors: Marc Ducharme, Boucherville (CA); Sylvain-Paul Morency, Laval (CA); Simon Gariepy, Laval (CA); Eric Lajoie, Montreal (CA)

(73) Assignee: Symbotic Canada, ULC (CA)

( * ) Notice: Subject to any disclaimer, the term of this patent is extended or adjusted under 35 U.S.C. 154(b) by 1068 days.

(21) Appl. No.: 17/805,318

(22) Filed: Jun. 3, 2022

(65) Prior Publication Data

US 2022/0388163 A1     Dec. 8, 2022

Related U.S. Application Data

(60) Provisional application No. 63/208,023, filed on Jun. 8, 2021.

(51) Int. Cl.
| | |
|---|---|
| *G06F 7/00* | (2006.01) |
| *B25J 9/00* | (2006.01) |
| *B25J 9/16* | (2006.01) |

(52) U.S. Cl.
CPC ........... *B25J 9/1612* (2013.01); *B25J 9/0009* (2013.01); *B25J 9/1633* (2013.01); *B25J 9/1687* (2013.01)

(58) Field of Classification Search
CPC ...... B25J 9/1612; B25J 9/0009; B25J 9/1633; B25J 9/1687; B25J 15/0004; B25J 15/0014; B25J 1/00; B25J 3/00; B25J 9/00; B25J 11/00; B25J 15/00; B25J 18/00; B25J 19/00; B25J 1/02; B25J 1/04; B25J 9/04; B25J 9/1623; B25J 15/0019; B25J 15/0028; B65G 47/90; B65G 61/00; B65G 47/24;
(Continued)

(56) References Cited

U.S. PATENT DOCUMENTS

| | | |
|---|---|---|
| 4,543,032 A | 9/1985 | Leverett et al. |
| 5,169,284 A | 12/1992 | Berger et al. |

(Continued)

FOREIGN PATENT DOCUMENTS

| | | | |
|---|---|---|---|
| EP | 3730433 | 10/2020 | |
| WO | WO-2019123734 A1 * | 6/2019 | .............. B25J 13/08 |

*Primary Examiner* — Yolanda R Cumbess

(74) *Attorney, Agent, or Firm* — Perman & Green, LLP

(57) ABSTRACT

A tool, for palletizing mixed load products, includes a frame for mounting the tool to a robot, a support assembly having a support member forming a support surface disposed in a predetermined reference orientation so as to support product, and a gripping assembly, mounted to the frame, with an actuator and a grip press operably coupled to the actuator so as to move the grip press relative to the frame in an actuation direction opposite the support surface so as to clamp the product between the support surface in the predetermined reference orientation and the grip press. The support assembly coupling to the frame has a configuration fixing the support member relative to the frame in the actuation direction with the support surface in the predetermined reference orientation, and is movably released in at least another direction so that the support member is movable away from the predetermined reference orientation.

25 Claims, 27 Drawing Sheets

(58) Field of Classification Search
CPC ...... B65G 47/244; B65G 47/00; B65G 57/00;
B65G 59/00; B65G 60/00; B65G 47/905;
B65G 47/96; B65G 47/965; B65G
47/967; B65G 57/005; B65G 57/02–03;
B65G 57/20–24; B65G 59/02–023; G05B
2219/40006; G05B 2219/40003; G05B
2219/40007; G05B 2219/40008; G05B
2219/40014; G05B 2219/40013
USPC ................................................. 700/213, 217
See application file for complete search history.

(56) References Cited

U.S. PATENT DOCUMENTS

| | | |
|---|---|---|
| 7,967,354 B2 | 6/2011 | Faulkner et al. |
| 9,011,074 B2 | 4/2015 | Diehr et al. |
| 10,300,610 B1 | 5/2019 | La Rovere et al. |
| 10,773,891 B2 | 9/2020 | High et al. |
| 10,940,999 B2 | 3/2021 | Kalouche |
| 2009/0162181 A1 | 6/2009 | Ryf |
| 2017/0305692 A1 | 10/2017 | Morency et al. |

* cited by examiner

24H

POSITION COMPLIANCE DEVICE

POSITION COMPLIANCE DEVICE

TOOL FOR PALLETIZING MIXED LOAD PRODUCTS, PALLETIZING ROBOT INCLUDING THE TOOL, AND METHOD THEREFOR

CROSS-REFERENCE TO RELATED APPLICATIONS

This application is a non-provisional of and claims the benefit of U.S. provisional patent application No. 63/208,023 filed on Jun. 8, 2021, the disclosure of which is incorporated herein by reference in its entirety.

BACKGROUND

1. Field

The exemplary embodiments generally relate to palletizing, and more particularly, to palletizing of mixed load products.

2. Brief Description of Related Developments

Warehouses, distribution centers and fulfillment centers typically receive full pallets of uniform products. In many cases, the products are depalletized and stored individually in a storage area. When specific orders need to be prepared, the products are transported to palletizer cells, which can be either manual, automated or robotized.

Because of the wide variety of products, a special and versatile end of arm tool is required when the robotized approach is taken. Typical tools to grip products are equipped with vacuum cups or pads. Such tools are economical and easy to use. While they can be used with closed boxes or cartons, they show limitations to grip trays, stretch wrapped products or the like. Problems may also occur if the top flaps of the boxes are not glued or tapped adequately. Because of the multiplication of product sizes and formats found in warehouses and distribution centers, a more robust and versatile tool is required.

The use of a fork-type tool allows solving the above-mentioned drawback of the vacuum cups or pads. Traditionally, the bottom forks of such tools can be extended or retracted. When a product is gripped the bottom forks are extended to go underneath the product, and the bottom forks are retracted when the product is dropped in place. This type of tool is popular, considering that it can handle virtually any type of product in a reliable fashion.

However, one drawback to conventional fork-type tools relates to the width of the bottom forks. Ideally, each bottom fork should be wide enough to be able to pick and handle products of various dimensions, but when it is too large, it limits the capacity to drop narrow products on the pallet considering that the wide forks might interfere with products already in place on the pallet. The, use of narrow bottom forks leads to other drawbacks such as decreased durability of the bottom forks. For example, narrower bottom forks may bend and deform easier than the wider bottom forks. Bottom forks that are bent or deformed may cause product pick and/or product placement errors when the products are transferred by a palletizing robot to be stacked on a pallet. As such, the bent or deformed bottom forks are replaced, where a time to the replacement of the bottom forks may be significant leading to increased downtime of the palletizing robot.

Conventional fork-type tools may also encounter product placement errors in that a distance or height between a top of the bottom forks and a surface on which the product is to be placed may be such that the product drags or rotates upon contact with the placement surface. The dragging or rotating of the product may result in misaligned/misplaced products.

BRIEF DESCRIPTION OF THE DRAWINGS

The foregoing aspects and other features of the disclosed embodiment are explained in the following description, taken in connection with the accompanying drawings, wherein.

DETAILED DESCRIPTION

Figure 1:
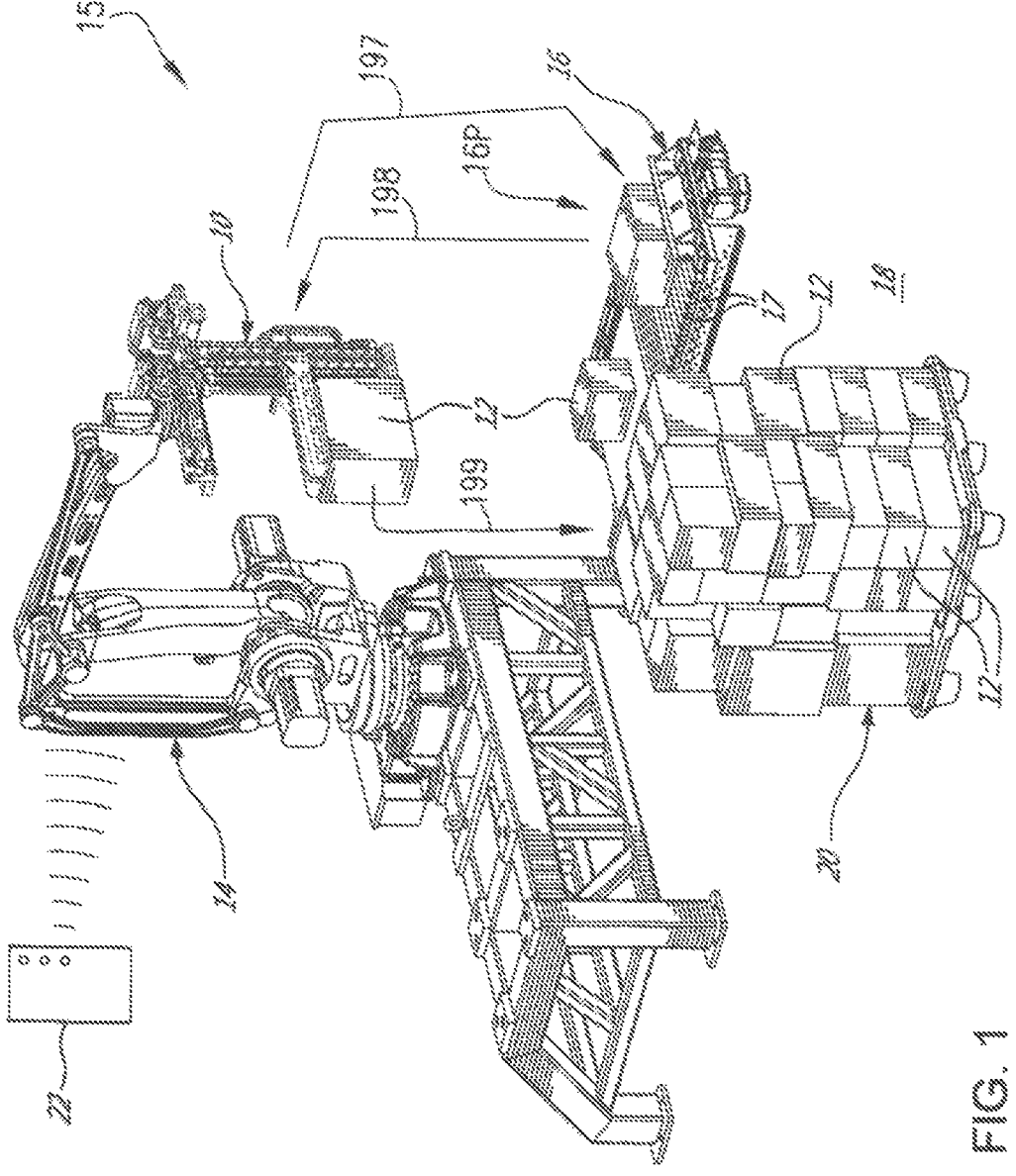
FIG. 1 is a perspective illustration of a palletizer cell for mixed load products incorporating aspects of the present disclosure.

FIG. 1 illustrates an exemplary palletizer cell 15 for mixed load products in accordance with aspects of the present disclosure. Although the aspects of the present disclosure will be described with reference to the drawings, it should be understood that the aspects of the present disclosure could be embodied in many forms. In addition, any suitable size, shape or type of elements or materials could be used.

The aspects of the present disclosure provide a palletizer cell 15 and a tool 10 for the palletizer cell 15 that provides for automatic calibration of the gripper and pusher assemblies of the tool 10, such as after a contact event between the tool 10 and an object. The tool 10 also provides for compliance of at least the support member(s) or fingers (also referred to as forks) 44 of the tool 10 in response to the contact event (i.e., the support member(s) 44 do not keep a permanent bend). The support surface 44S of the support member(s) 44 of the tool 10 provide for a minimized drop height when transfer products 12 from the tool 10 to a product holding location of the palletizer cell 15.

As will be described herein, the tool 10 includes one or more (e.g., various) impact mitigation and/or position compliance devices which together form a combined synergistic system. This synergistic system is a multi-degree of freedom impact mitigation and contingency system that includes kinematic release in one or more degree of freedom of one of the product clamp members (e.g., see the product top and product bottom clamp members as described herein). It is noted that while the kinematic release is illustrated in the figures and described in combination with one or more other features of the multi-degree of freedom impact mitigation and contingency system, the kinematic release may be employed alone or in any combination with any one or more other features of the multi-degree of freedom impact mitigation and contingency system.

The multi-degree of freedom impact mitigation and contingency system includes torque limitation/pose compliance deviation (e.g., of the products held by the tool) at the tool actuators. It is noted that while the torque limitation/pose compliance is illustrated in the figures and described in combination with one or more other features of the multi-degree of freedom impact mitigation and contingency system, the torque limitation/pose compliance may be employed alone or in any combination with any one or more other features of the multi-degree of freedom impact mitigation and contingency system.

The multi-degree of freedom impact mitigation and contingency system also includes substantially immediate identification of defects in the support members 44 in that the fingers substantially do not take on a permanent bend. Here the support members 44 are multi-degree of freedom frangible fingers that break from impact with object in the X, Y, and/or Z directions (see FIGS. 10 and 10B). Here a support member 44 is configured to break (as described herein) when a predetermined transverse force (e.g., in the Y or Z directions) or axial force (e.g., in the X direction along the longitudinal/major axis of the support member) exerted on the support member exceeds a predetermined/threshold amount of force so that the support member does not take on a permanent bend that may not be readily detectable. It is again noted that while the frangible fingers are illustrated in the figures and described in combination with one or more other features of the multi-degree of freedom impact mitigation and contingency system, the frangible fingers (e.g., which may be referred to as a defect annunciation system) may be employed alone or in any combination with any one or more other features of the multi-degree of freedom impact mitigation and contingency system.

The multi-degree of freedom impact mitigation and contingency system also includes contingency planning with respect to any broken support members 44. For example, as will be described herein, the aspects of the present disclosure provide for the fast swap replacement of the support members 44 via a support member configuration that provides for sliding the support members into and out of a mounting bracket and/or retention of the support members in the mounting bracket with set screws. The set screws provide for a clamping of the support members in the mounting bracket with minimal impedance to remove the support members from the mounting bracket. As with the other features of the multi-degree of freedom impact mitigation and contingency system, the contingency planning is illustrated in the figures and described in combination with one or more other features of the multi-degree of freedom impact mitigation and contingency system; however, the contingency planning may be employed alone or in any combination with any one or more other features of the multi-degree of freedom impact mitigation and contingency system.

The effect of the multi-degree of freedom impact mitigation and contingency system is that the trajectory of the tool 10 (and the robot arm) is time optimized or time optimal. For example, the robot arm moves the tool 10 in a bang-bang motion that is at least in part greater or faster than conventional palletizing systems.

Figure 1A:
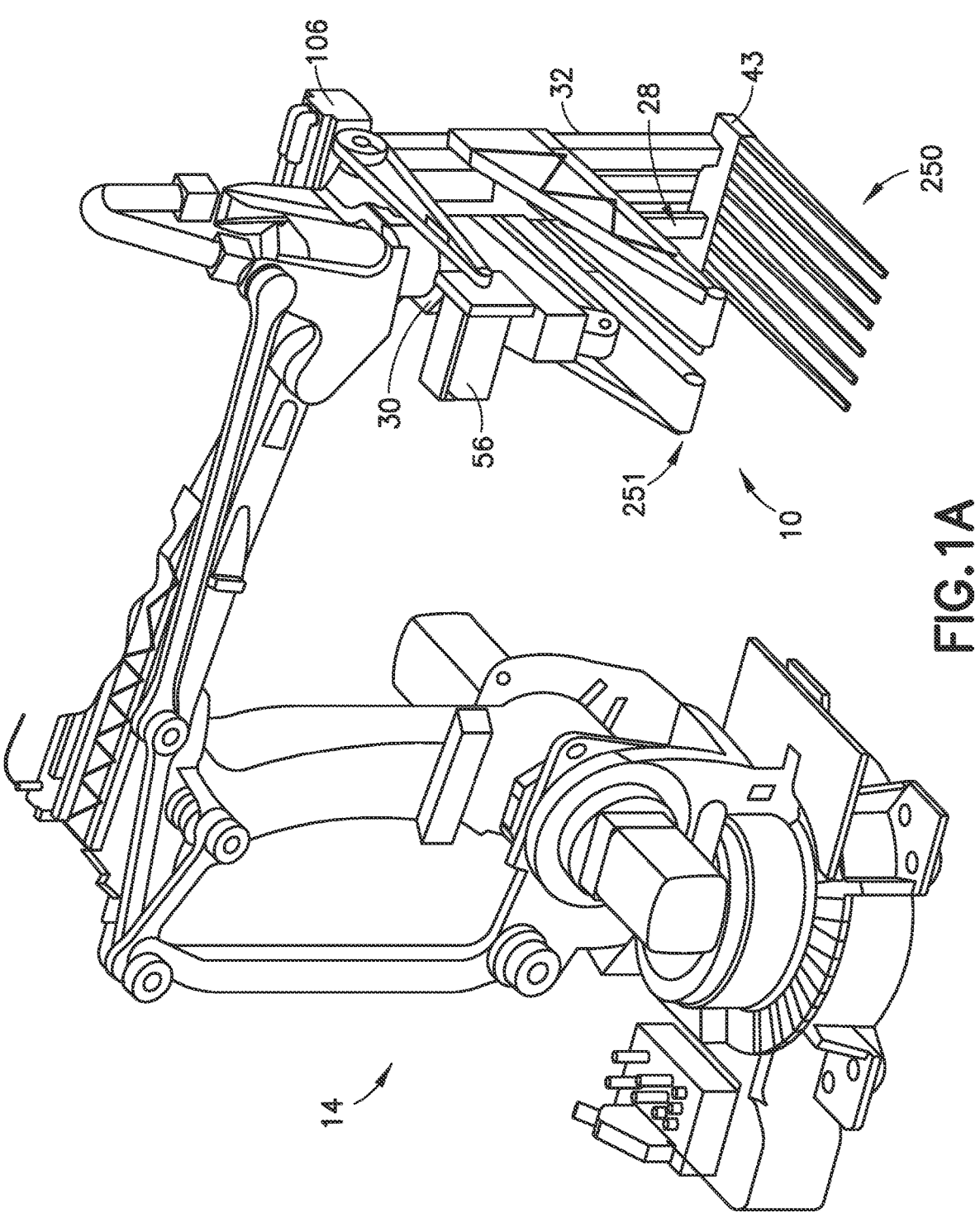
FIG. 1A is a perspective illustration of a portion of the palletizer cell of FIG. 1 in accordance with aspects of the present disclosure.

As shown in FIGS. 1 and 1A, the palletizer cell 15 includes an industrial robot arm (or robot) 14 to which an end of arm tool, such as tool 10, is coupled in according aspects of the present disclosure. The robot arm 14 is configured to position the tool 10 adjacent both an infeed conveyor 16 and a pallet receiving station 18. The ensemble of the robot arm 14 with the tool 10, infeed conveyor 16, and pallet receiving station 18 is referred to herein as the palletizer cell 15. A suitable example of a palletizer cell is provided in U.S. Pat. No. 9,701,490 issued on Jul. 11, 2017 (entitled "Method and Tool for Palletizing Mixed Load Products), the disclosure of which is incorporated herein by reference in its entirety.

Products 12, that can be of various sizes, are input to the palletizer cell 15 and arrive from the infeed conveyor 16. Each product 12 is gripped by the tool 10 in such a way as to firmly hold the product 12 to enable fast transfer to a pallet 20 without damaging the product 12 and without relative movement between the product 12 and the tool 10. The product 12 is then released and placed on the pallet 20.

The expression "product" should be construed herein as including any type of case, carton, tray, stretch wrapped, etc. Generally, the product is of a rectangular shape. The product dimensions may vary greatly between each different types of product. Typical dimensions (W×L×H) are between 4"×6"× 2" (10.16 cm×15.25 cm×5.08 cm) and 20"×25"×24" (50.8 cm×63.5 cm×61.0 cm). It is to be noted that the illustrated products are referred to using the same reference number 12, while they may vary in configuration and size.

The infeed conveyor 16 is in the form of a roller type conveyor. In other aspects, the products 12 are brought to a location within reach of the robot arm 14 via another type of conveyor such as a narrow belt conveyor with a pop-up mechanism between the narrow belts to lift the products, or conveyed within reach of the robot arm 14 in any suitable manner.

The pallet receiving station 18 is in the form of a cleared area within reach of the robot arm 14. The cleared area is sufficiently large to receive a full mixed load pallet.

The robot arm 14, to which the tool 10 is attached, is a standard four-axis or six-axis industrial articulated robot arm. Equipped with the tool 10, the robot arm 14 securely grips and transfers one or more products 12 from the infeed conveyor 16 to the pallet 20. A conventional robot arm can be used, such as ABB's IRB 660 or IRB 6640, FANUC's R2000 or M410, or any similar robot arm offered by other manufacturers like Kuka or Motoman. The robot arm 14 includes other well-known systems and components that allow its operation. Since these systems and components are believed to be well-known in the art, they will not be described herein in more detail for concision purposes. The expressions "robot" and "robot arm" are used interchangeably herein to mean a programmable system including articulated and/or movable members that can receive, control and move a tool, such as tool 10.

The robot arm 14 is conventionally coupled to a controller 22 that controls the operation of the robot arm 14 and tool 10. The expression "controller" should be construed broadly as including one or more electronic devices, including for example one or more computers that are configured with components and/or programmed with instructions that produce one or more functionalities, including communicating data and instructions with an electronic or electro-mechanical machine or device.

With reference to FIGS. 2, 2A, 2B, 3A-3C, and 4, a tool 10A will now be described in more detail. The tool 10A may be substantially similar to tool 10 illustrated in FIG. 1. The tool 10A comprises a frame 24 for mounting the tool 10A to the robot arm 14, a support assembly 250, a gripping assembly 26, and a pusher assembly 28, all of which are mounted to the frame 24, and a width-adjusting assembly 29. The frame 24 receives a robot-mounting bracket or wedge 30 that allows the tool 10A to be conventionally attached to the robot arm 14, where the robot-mounting bracket 30 is coupled to the frame in any suitable manner, such as with mechanical and/or chemical fasteners. As will be described in further detail below, in some aspects, the robot-mounting bracket 30 is configured to mount the tool 10A to the robot arm 10A so that the tool 10A is angled θ with respect to a mounting surface of an end of arm tool mount 1100 of the robot arm 14 (see FIG. 11). Here the robot-mounting bracket 30 provides for a one-step tool 10 positioning (relative to the robot end of arm tool mount 1100) to a predetermined orientation (e.g., the angle θ) via the wedged interface provided by the robot-mounting bracket 30 between the frame 24 and the end of arm tool mount 1100. The robot-mounting bracket 30 resolves any end of arm tool mount 1100 variances where the interface, provided by the robot-mounting bracket 30, between the tool 10 and the end of arm tool mount 1100 is set to a predetermined inclination datum or predetermined level plane PLN (see FIG. 12).

Figure 2:
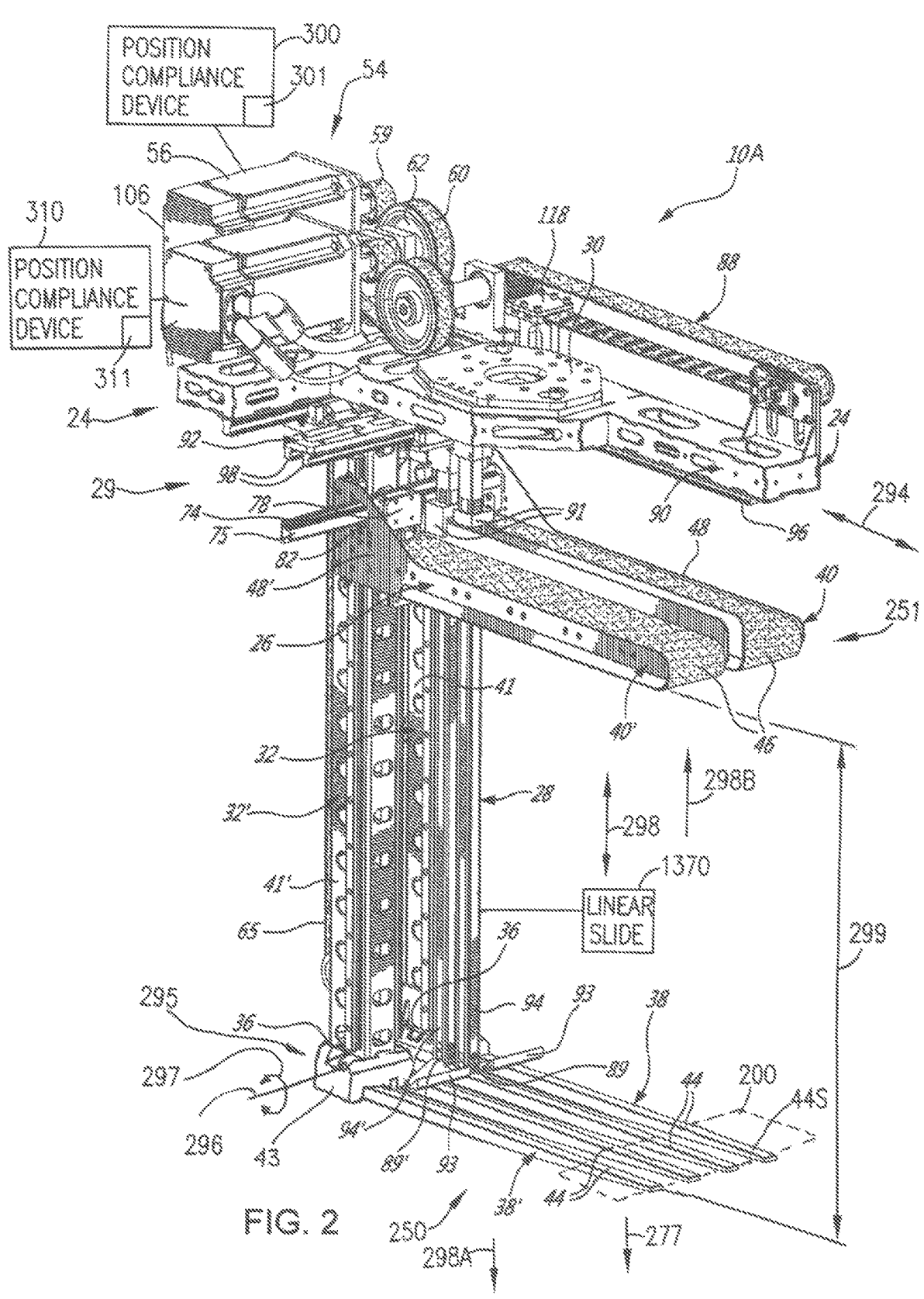
FIG. 2 is a perspective illustration of a tool for mixed load palletizing incorporating aspects of the present disclosure.
Figure 2A:
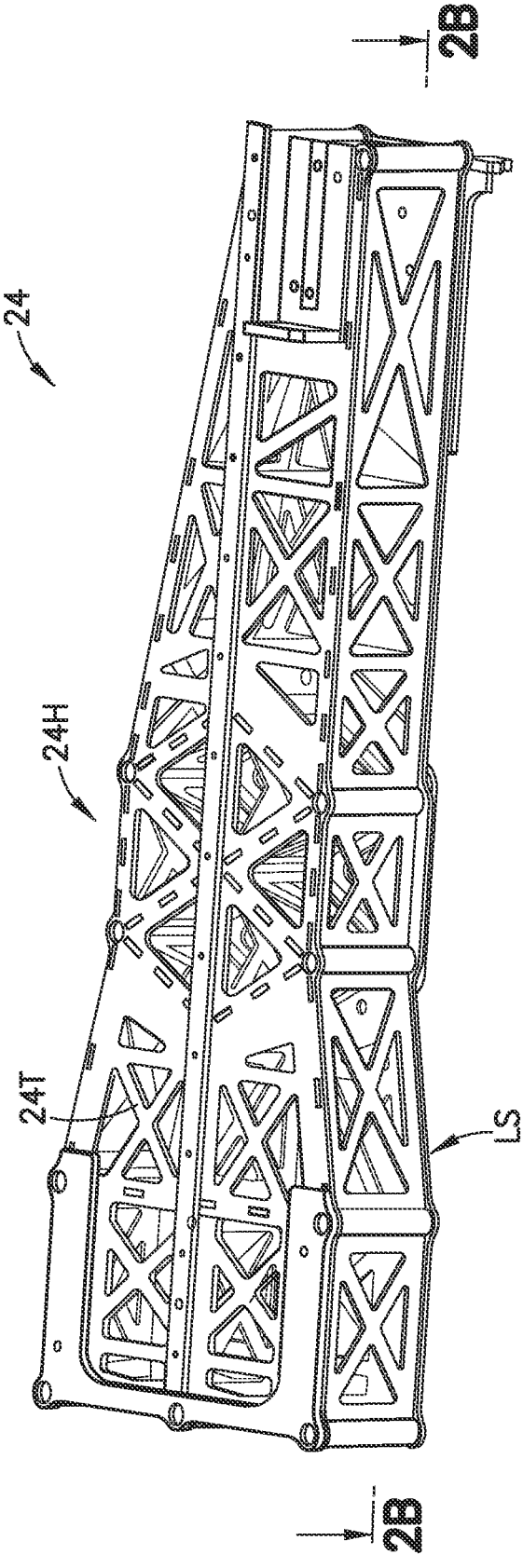
FIG. 2A is a perspective illustration of a portion of the tool of FIG. 2 in accordance with aspects of the present disclosure.
Figure 2B:
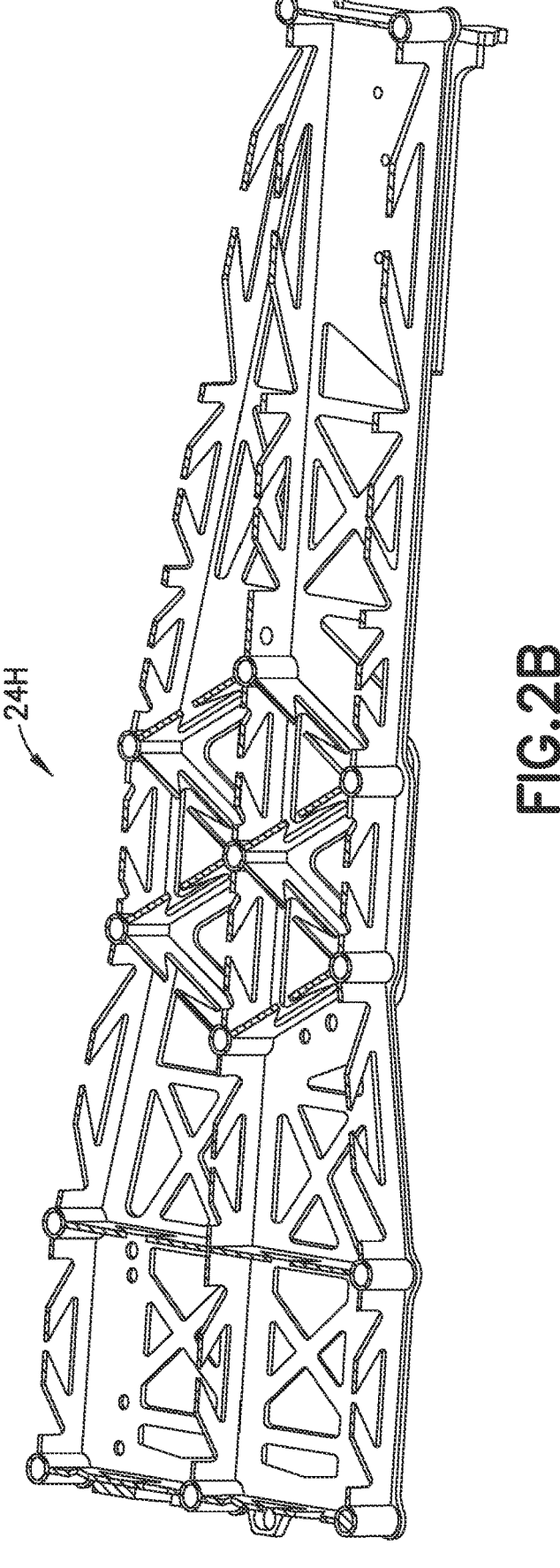
FIG. 2B is a cross-sectional perspective illustration of the portion of the tool illustrated in FIG. 2A in accordance with aspects of the present disclosure.

The frame 24 has any suitable configuration for mounting the tool 10A to the robot arm 14. For example, as illustrated in FIG. 2 the frame 24 has a substantially enclosed boxed configuration having any suitable shape for mounting the components (described herein) of the tool 10A to the frame and for coupling the frame 24 to the robot arm 14. In one or more aspects, the frame 24 includes any suitable reinforcing members (e.g., cross braces, posts, ribs, etc.) in one or more portions of the frame 24, such as a portion of the frame 24 to which the mounting bracket 30 is coupled. As another example, as illustrated in FIGS. 2A and 2B, the frame 24 has a closed lattice structure LS configuration where at least a portion of the frame 24 forms a honeycomb structure 24H configured for coupling with the mounting bracket 30. The lattice structure LS of the frame 24 and the honeycomb structure 24H thereof are configured to resist static and/or cyclic/dynamic loads induced on/in the frame from robot arm 14 movements and/or loading and unloading of products to and from the tool 10A, where the static and/or cyclic/dynamic loads may create fatigue conditions (e.g., resulting from transport cycles, flexure from drive actuations (noting in some aspects drives 56, 109 are located substantially at opposite ends of the frame 24 so that the robot-mounting bracket 30 is disposed between the drives 56, 109), and/or maximum allowable loads due to impact predictions, etc.) along one or more portions of the frame 24. For example, at least the honeycomb structure 24H is configured to resist load induced fatigue at the coupling between the robot arm 14 and the frame 24 (e.g., via the mounting bracket 30). Here, the frame 24 includes a plurality of trusses 24T (which may be integrally formed each other or otherwise coupled to each other such as by mechanical and/or chemical fastening) so as to form the closed lattice structure LS and the honeycomb structure 24H thereof, where the trusses 24T are located on lateral sides, longitudinal ends, top side and bottom side of the frame 24 (see FIGS. 2A and 2B). It should be understood that while the frame 24 is illustrated as being either a boxed frame or a latticed frame in the figures, in other aspects the frame 24 is a combination of a boxed frame and a latticed frame where at least some portions of the frame 24 have the boxed configuration while at least other portions of the frame have the latticed/honeycomb configuration. For exemplary purposes only, in some aspects a combined boxed/lattice frame includes a latticed honeycomb structure at a portion of the frame for coupling with the mounting bracket 30 and robot arm 14 and includes one or more boxed frame sections for mounting of the tool 10A components to the frame 24. It is noted that while the frame 24 configurations described herein are illustrated in the figures and described in combination with one or more other features of the multi-degree of freedom impact mitigation and contingency system, each frame configuration may be employed alone or in any combination with any one or more other features of the multi-degree of freedom impact mitigation and contingency system described herein.

The support assembly 250 is movably coupled to the frame 24 as will be described further herein so as to rotate in a released or compliance direction 297 about pivot axis 296. The support assembly 250 has a support base or mounting bracket 43 that is dependent from the frame 24 and one or more support member(s) or finger(s) 44 that is/are dependent from and projects from the mounting bracket 43. While the figures illustrate the tool 10, 10A, 10B having three, four, or six support members 44, it should be understood that the number of support fingers illustrated is exemplary and in other aspects the tool 10, 10A, 10B has less than three, five, or more than six support members 44. The support member(s) 44 is/are connected to the frame 24 by the mounting bracket 43. Here it is anticipated that the support assembly 250 deposits or places products from above (e.g., in direction 298A) and so support members 44 approach proximate the placement surface. Accordingly, in one aspect the coupling between mounting bracket 43 and frame 24 is disposed above the support members 44. The support member(s) 44 form a support surface 44S disposed in a predetermined reference position and orientation (referred to herein as the predetermined reference orientation), as will be described herein, so as to support thereon a product 12 seated on the support surface 44S. In this aspect, the support assembly 250 includes fork assemblies 38, 38', each of which is defined by one or more (here two are illustrated) parallel support members 44. Each pair of support members 44 is secured to a respective post 41, 41' via a mounting bracket 43 that is fixedly mounted to the post 41, 41' at the distal end 36 thereof. The support members 44 of the two fork assemblies 38, 38' extend from a respective post 32, 32' so that support surfaces 44S of the support members 44 are planar and define(s) a predetermined reference plane 200 in a predetermined reference orientation (see FIGS. 2 and 12, and described in greater detail below) of the support assembly 250. The support members 44 are beveled (resulting in support surface 44S and reference plane 200 being inclined or pitched) to ease their insertion under a product 12 and aid placement of the product onto the pallet 20 as will be described further herein. While the support members are shown as being mounted to the respect post 41, 41' in pairs through a common mounting bracket 43, in other aspects each support member 44 has its own respective mounting bracket; while in other aspects, a single mounting bracket is provided that is common to all support members 44 for commonly coupling the support members to the posts 41, 41'. In still other aspects, the fork assemblies 38, 38' include any suitable number of support members 44 (e.g., more or less than two) and/or the support members 44 any suitable shape other than the one shown in the Figs. As will become more apparent upon reading the following description, a part(s) that is/are referred to with a prime (') is/are substantially identical to the other part identified with the same but unprimed reference, the only difference being that the primed reference numeral refers to a part that is movable.

The gripping assembly 26 is mounted to the frame 24 with an actuator or first drive assembly 54 and a grip press 251 operably coupled to the first drive assembly 54 so as to move the grip press 251 relative to the frame 24 in an actuation direction 298 opposite the support surface 44S so as to clamp the product 12 between the support surface 44S in the predetermined reference orientation and the grip press 251. The gripping assembly 26 includes two parallel first track assemblies 32, 32', each extending from the frame 24 between a proximate end 34 to a distal end 36, two fork assemblies 38, 38', each fixedly mounted to a respective track assembly 32, 32' at the distal end 36 thereof, and two side by side gripping members 40, 40', each one being mounted to a respective one of the two track assemblies 32, 32' so as to extend generally perpendicularly therefrom and for movement in unison therealong. The gripping members 40, 40' are maintained in parallel relationship with the fork assemblies 38, 38'.

Each track assembly 32, 32' is in the form of a hollow rectangular post 41, 41' including tracks 42, 42' secured on both lateral sides thereof. The track assemblies 32, 32' are not limited to hollow rectangular posts and in other aspect, can take any other rigid form that can receive and position an elongated track and fork assemblies 38, 38'.

Each gripping member 40, 40' includes an endless belt 46 that is mounted to and secured between two shoe-shaped side plates 48, 48'. Each gripping member 40, 40' is slidably mounted to a respective post 41, 41'. More specifically, rail-engaging elements 50 are secured to both shoe-shaped side plates 48, 48' near the proximate enlarged ends (e.g., the end nearest the posts 41, 41') thereof. The distance between the facing plates 48, 48' is such that the gripping members 40, 40' remain mounted to its respective tracks 42, 42' when the gripping members 40, 40' are moved therealong.

As described above, the grip press 251 is moved relative to the frame 24 in an actuation direction 298 opposite the support surface 44S so as to clamp the product 12 between the support surface 44S in the predetermined reference orientation and the grip press 251. With reference to the grip press 251, the predetermined reference orientation is where the support surface 44S (and the plane 200 formed thereby) is substantially parallel with the bottom portions of the gripping members 40, 40' (or substantially parallel with the bottom portion of the pad 176 in FIGS. 5 and 6). With reference to the frame 24, the predetermined reference orientation is where the support surface 44S (and the plane 200 formed thereby) is substantially oriented at a pitch angle θ (which corresponds with the angle θ effected by the robot-mounting bracket 30) relative to the mounting surface 1210 (here substantially horizontal) of the robot-mounting bracket 30, coupled to the frame 24, that interfaces with and couples to the end of arm tool mount 1100 of the robot arm 14 (see FIG. 12).

Figure 9:
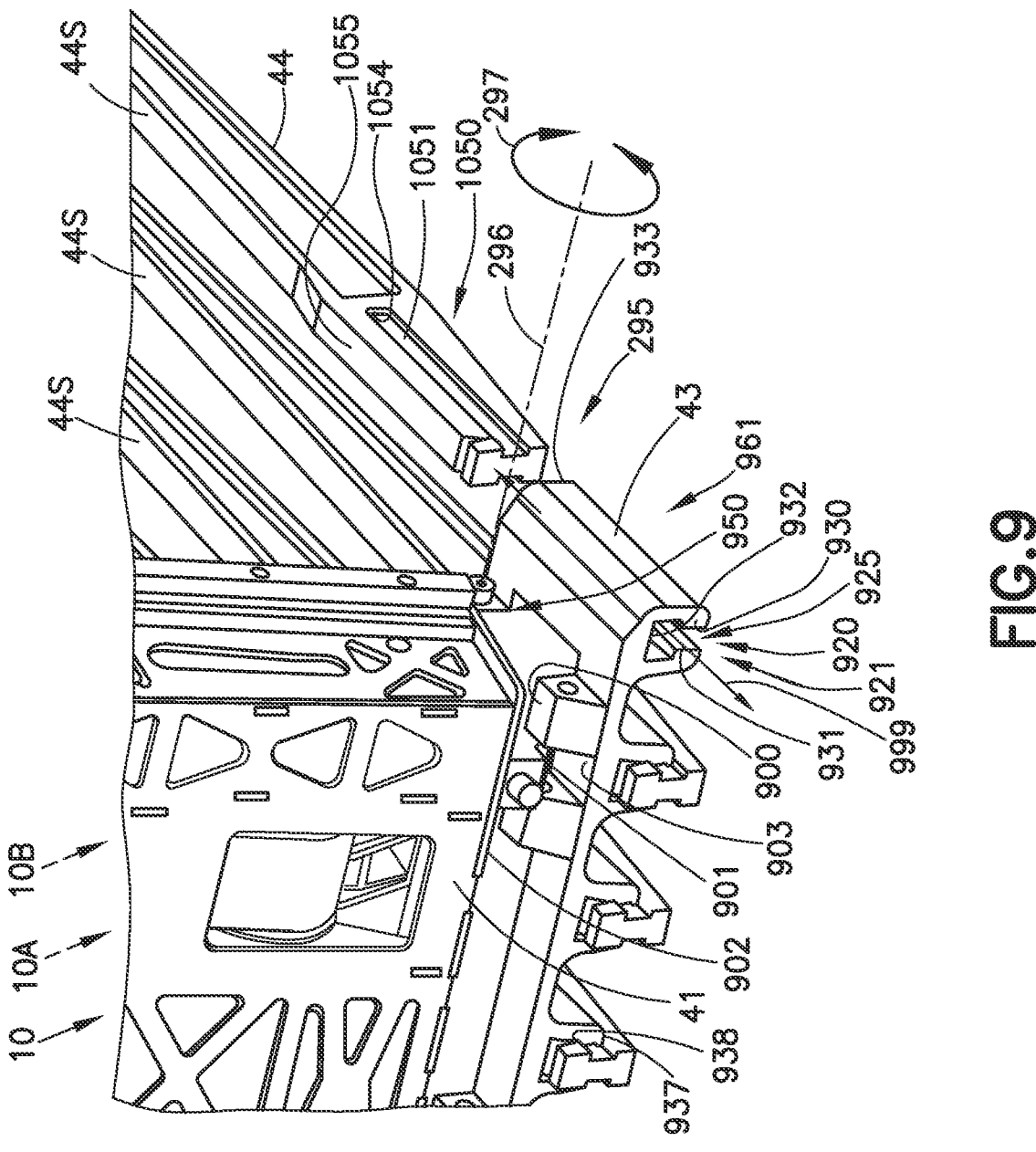
FIG. 9 is a partial perspective illustration of a fork coupling of the tools of FIGS. 2 and 5 in accordance with aspects of the present disclosure.
Figure 9A:
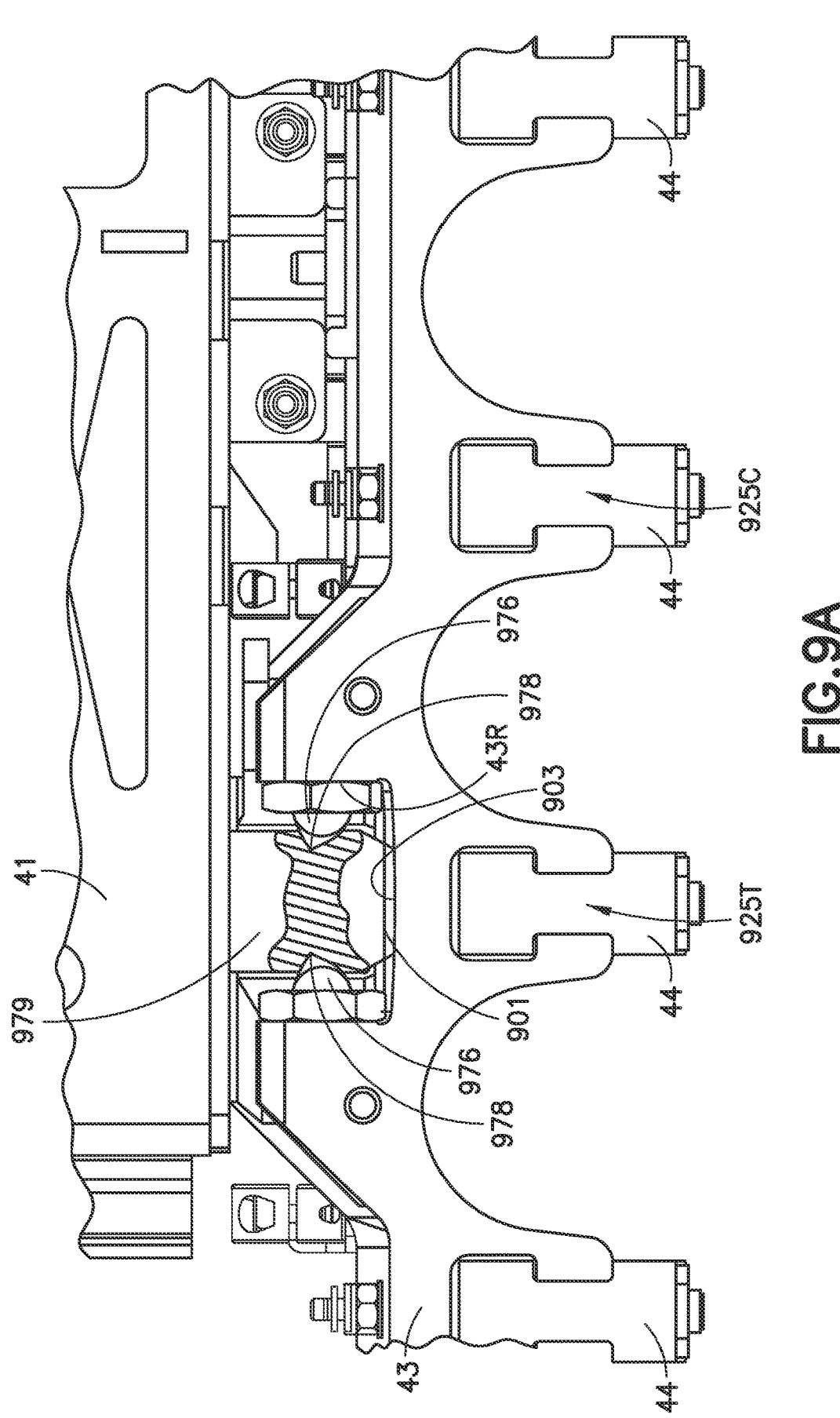
FIG. 9A is a partial plan illustration of the fork coupling of FIG. 9 in accordance with aspects of the present disclosure.

The predetermined reference orientation may be set by one or more stop surfaces 900-903 (see FIG. 9) of one or more of the mounting bracket 43 and posts 41, 41'. In one aspect, the stop surfaces 900 of the mounting bracket 43 contact stop surface 902 of the respective post 41, 41' to arrest rotational movement (here, clockwise) of the support members 44 in direction 297 and set the predetermined reference orientation. In another aspect, the stop surface 901 of the respective post 41, 41' contacts stop surface 903 of the mounting bracket 43 to arrest rotational movement of the support members 44 in direction 297 and set the predetermined reference orientation. In other aspects, any suitable combination of stop surfaces 900-903 may be used to arrest rotation movement of the support members 44 in direction 297 to set the predetermined reference orientation; while in still other aspects the predetermined reference orientation may be set in any suitable manner. Referring also to FIG. 9A, in one or more aspects, the stop surface 901 of the respective post 41, 41' is disposed on or is otherwise formed by a protrusion 979 that extends from the respective post 41, 41'. The mounting bracket 43 includes recesses 43R, each recess 43R being configured to receive a respective protrusion 979 and having or otherwise forming the stop surface 903 of the mounting bracket 43. The protrusion 979 and the respective recess 43R form a releasable detent or latch that at least in part maintains the support members 44 in the predetermined reference orientation. For example, at least one protrusion 979 includes one or more recesses 978 disposed on one or more sides of the protrusion 979. At least one recess 43R includes biased detent members 976 (e.g., balls, pins, etc.) that are biased towards a respective recess 978 of the at least one protrusion 979, where the recess 978 is shaped and sized so that at least a portion of a respective biased detent member 976 is received by and engages the recess 978. The bias force exerted by the biased detent member 976 against the recess 978 along with the shapes of the engagement surfaces of the biased detent member 976 and the recess 978 is such that the support members 44 are releasably maintained in the predetermined reference orientation (e.g., the releasable detent/latch formed by the recess 978 and biased detent member 976 is released upon a predetermined force being applied to the support members 44 so as to provide compliance of the gripping members 40, 40' as described herein while substantially preventing undesired motion of the gripping members 40, 40' during, e.g., unloaded movement of the tool 10, 10A, 10B by the robot arm 14).

It is noted that the support members 44 and mounting brackets 43 may be held in the predetermined reference orientation at least in part by virtue of the cantilevered weight of the support members 44. For example, the support members 44 are cantilevered from the mounting bracket 43 so that a force 277 is generated by the weight of the support members 44 on one side of the pivot axis 296 so that the support members 44 and mounting brackets 43 are be held in the predetermined reference orientation. The support assembly coupling 295 to the frame 24 has a configuration fixing the support member 44 relative to the frame 24 in the actuation direction 298 with the support surface 44S in the predetermined reference orientation and that is movably released in at least another direction 297 (e.g., here counterclockwise, away from the predefined reference orientation). Here, the another direction 297, is a released or compliance direction that is oriented substantially against the actuation direction 298 so that the support member 44 is movable relative to the frame 24 so that the support surface 44S moves substantially freely away from the predetermined reference orientation in the direction 297, as will be described further herein.

Figure 13:
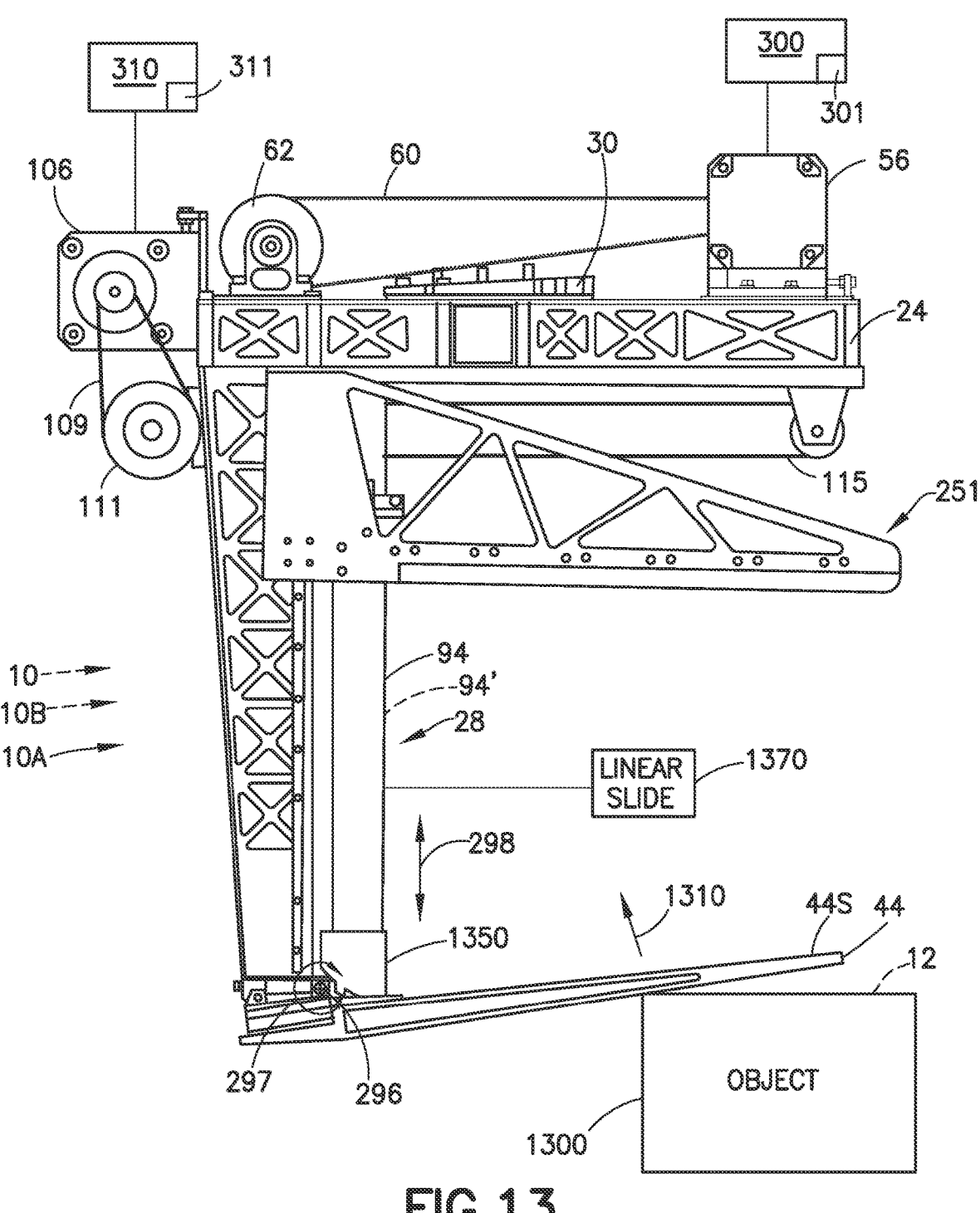
FIG. 13 is a side elevation illustration of a tool that is representative of the tools of both FIGS. 2 and 5 in accordance with aspects of the present disclosure.
Figure 13A:
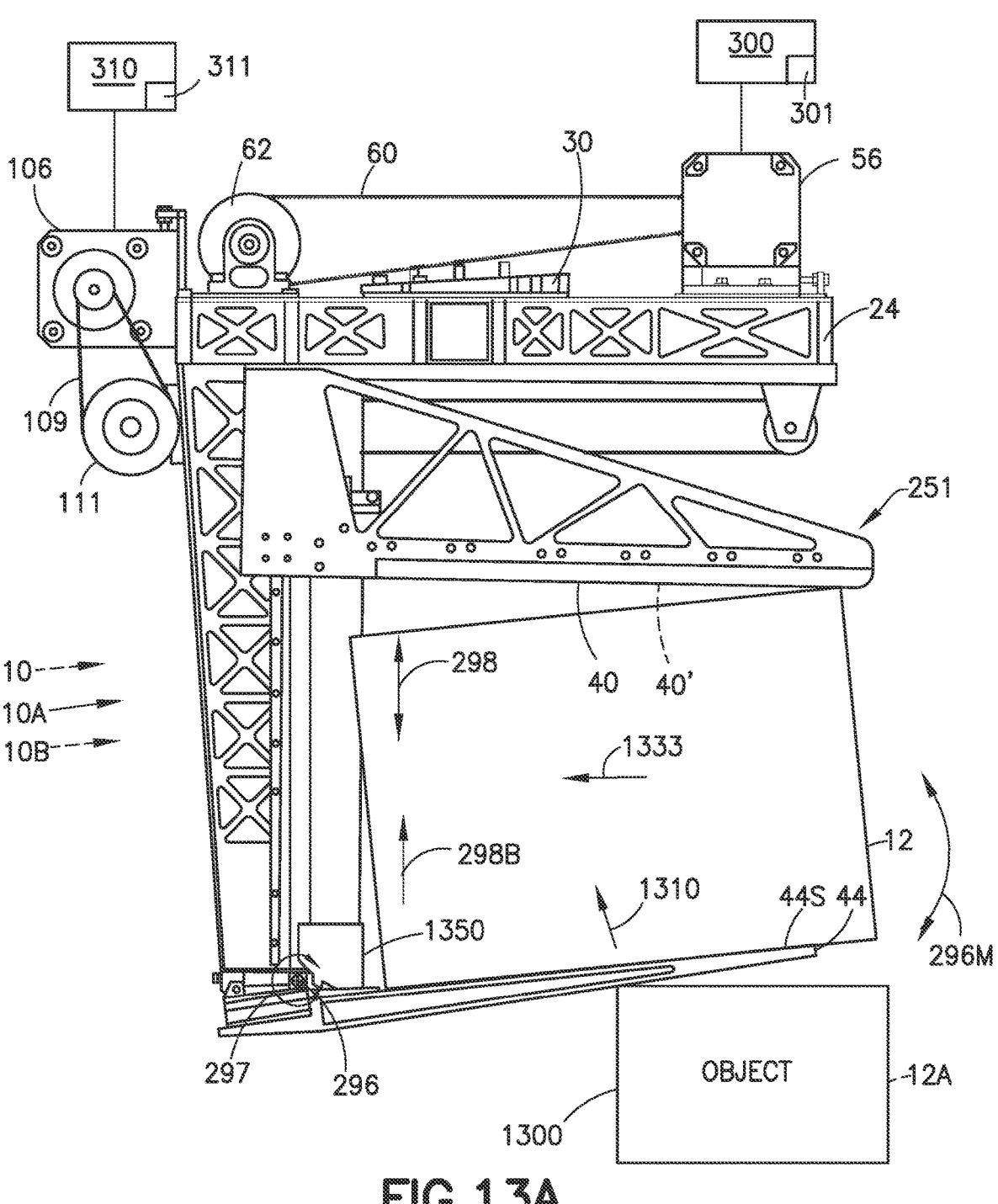
FIG. 13A is a side elevation illustration of a tool that is representative of the tools of both FIGS. 2 and 5 in accordance with aspects of the present disclosure.

Still referring to FIGS. 2, 3A-3C, and 4, and also to FIG. 13A, the distance 299 (FIG. 2) between the bottom portions of the gripping members 40, 40' and the top portion of the respective fork assemblies 38, 38' defines the opening of the gripping assembly 26 and can be adjusted for the height of a given product 12. For that purpose, the position and movement of the gripping members 40, 40' are servo-driven and, in one aspect, pneumatically actuated by a first drive assembly 54. The gripping assembly 26 has a position compliance or conformance device 300 disposed so that the grip press 251 actuation to clamp the product 12 between the support surface 44S and the grip press 251 is compliant or conformal to a displaced position of the support surface 44S away from the predetermined reference orientation (as shown in FIG. 13A the grip press 251 may move in direction 298, maintaining grip on the product 12, in response to the displacement of the support surface 44S and the product 12 held thereon). In one aspect, the position compliance device 300 may be included in the first drive assembly 54. For example, the first drive assembly 54 includes a first drive 56 having a torque limiting device 301 and an output shaft provided with a first pulley 58 that operatively receives an endless belt 60, that is further mounted on a second pulley 62. The torque limiting device 301 may be any suitable mechanical or electrical device that limits torque of the first drive 56, such as a mechanical spring loaded friction clutch, a spring loaded splined clutch, an electromotive force (EMF) feedback in the first drive 56 that senses increased current and activates an electronic clutch, etc.). A roll 59, that is rotatably mounted to the frame, is provided to tension the belt 60. The pulley 62 is mounted to a first end of a shaft, and a driven gear 64 is provided at its other end. The driven gear 64 is rotatably mounted to the frame 24 and receives an endless timing belt 65.

The coupling assembly 70 operatively couples the timing belt 65 to the track 42 of the fixed post 41. Another coupling assembly 71 operatively couples the distal end 69 of the pneumatic actuator 68 to side plate 48. The horizontal bar 74 is coupled to the gripping assembly 40-40' as can be better seen from FIG. 3a.

A horizontal bar 74, that is secured to the gripping member 40 on the side of the fixed post 41 and that is slidably received by the other gripping member 40, forces both gripping members 40, 40' to slide along the track assemblies 42, 42' in unison in the actuation direction 298 when the first drive assembly 54 is actuated.

The width-adjusting assembly 29 allows moving the tool 10A between two specific width configurations, a narrow and a wide configuration, depending on the size of each product 12 to pick. More specifically, the width-adjusting assembly 29 allows moving and maintaining the distance between the movable post 41' and the fixed post 41 (and the support members or forks supported thereby), and therefore between the gripping members 40 and 40' and between the forks 38 and 38'.

Figure 3A:
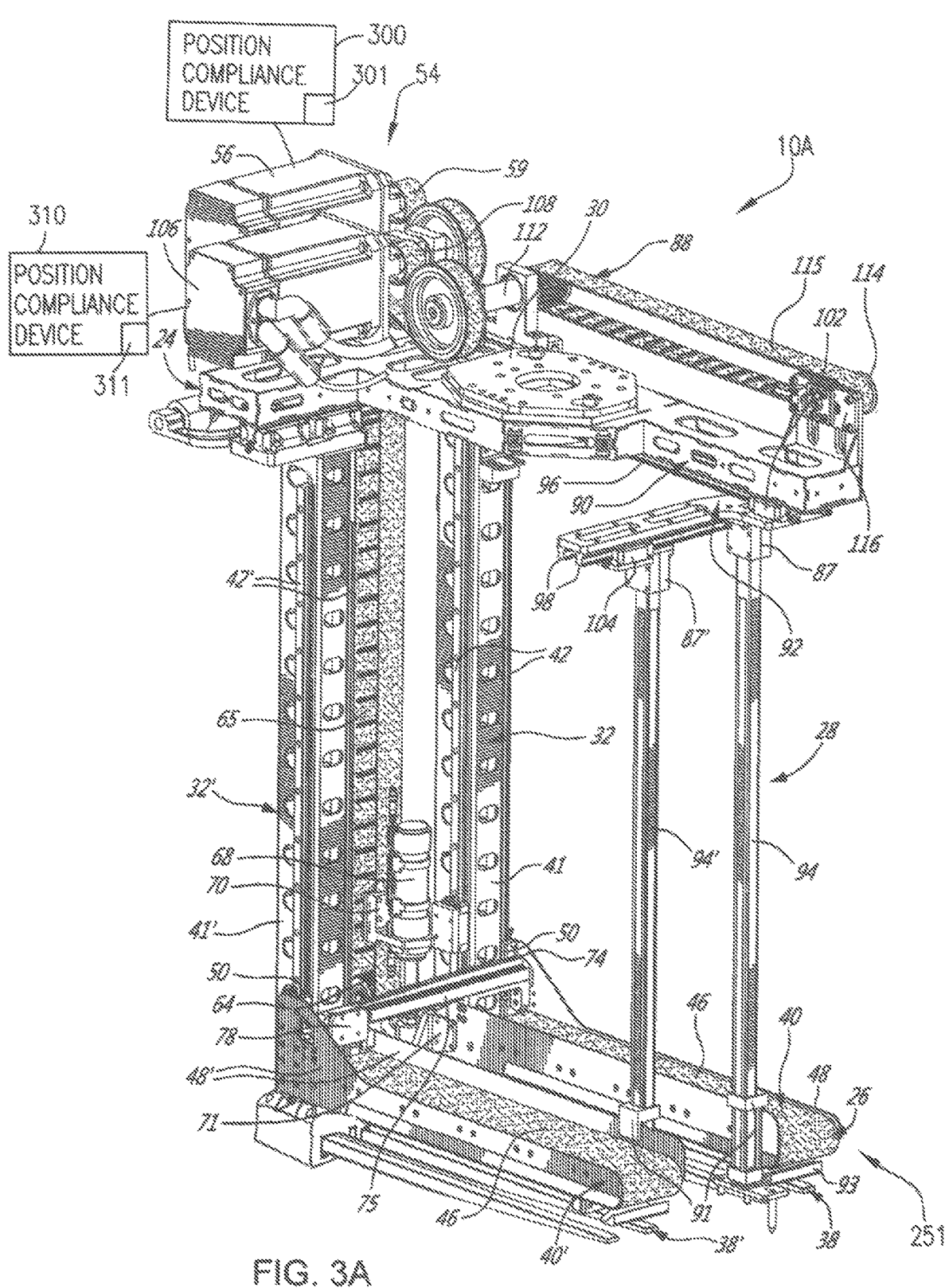
FIG. 3A is a perspective illustration of the tool of FIG. 2 in its wider configuration, the gripping members in their lower position, and the pusher bar(s) in a front position in accordance with aspects of the present disclosure.
Figure 3B:
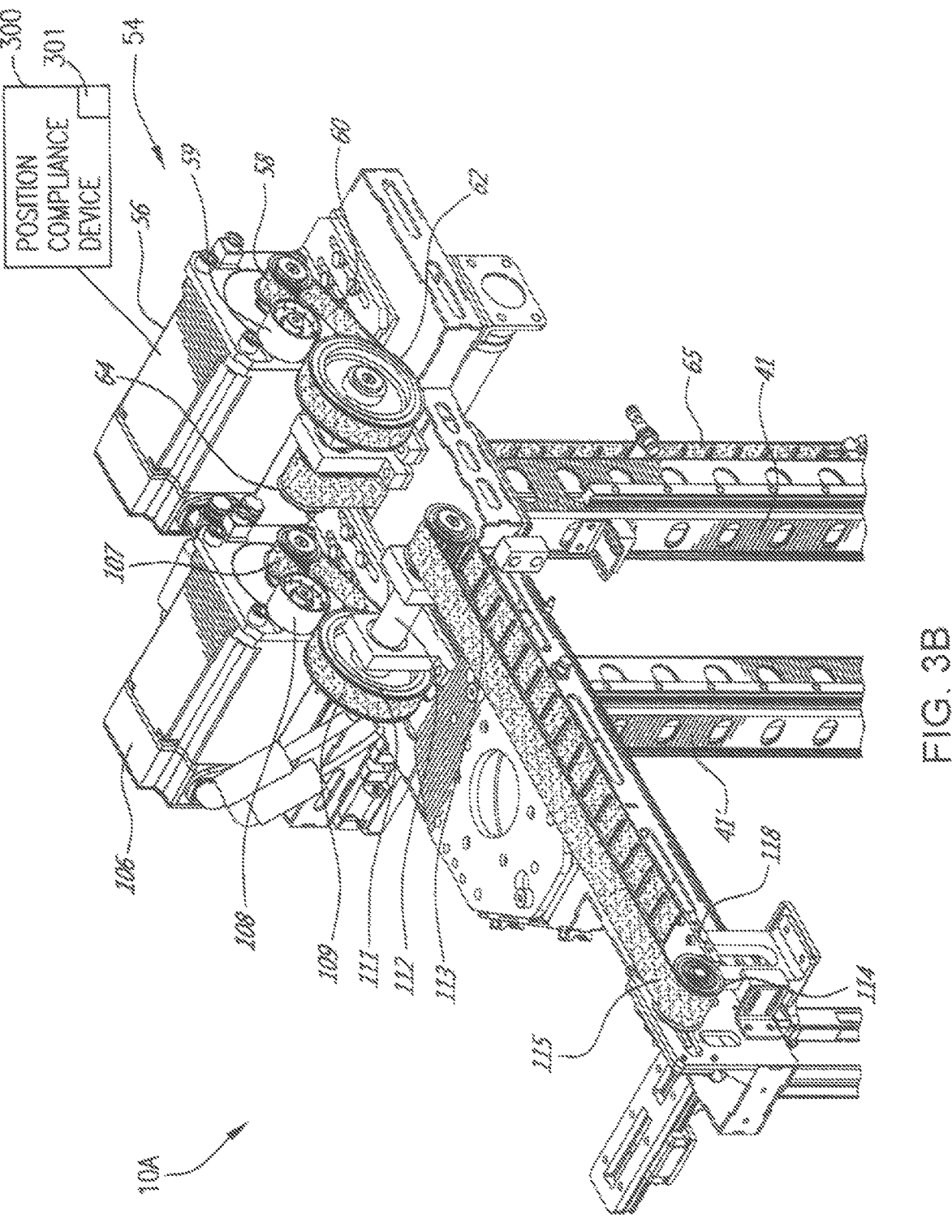
FIG. 3B is a partial perspective illustration of the tool of FIG. 2 in accordance with aspects of the present disclosure.
Figure 3C:
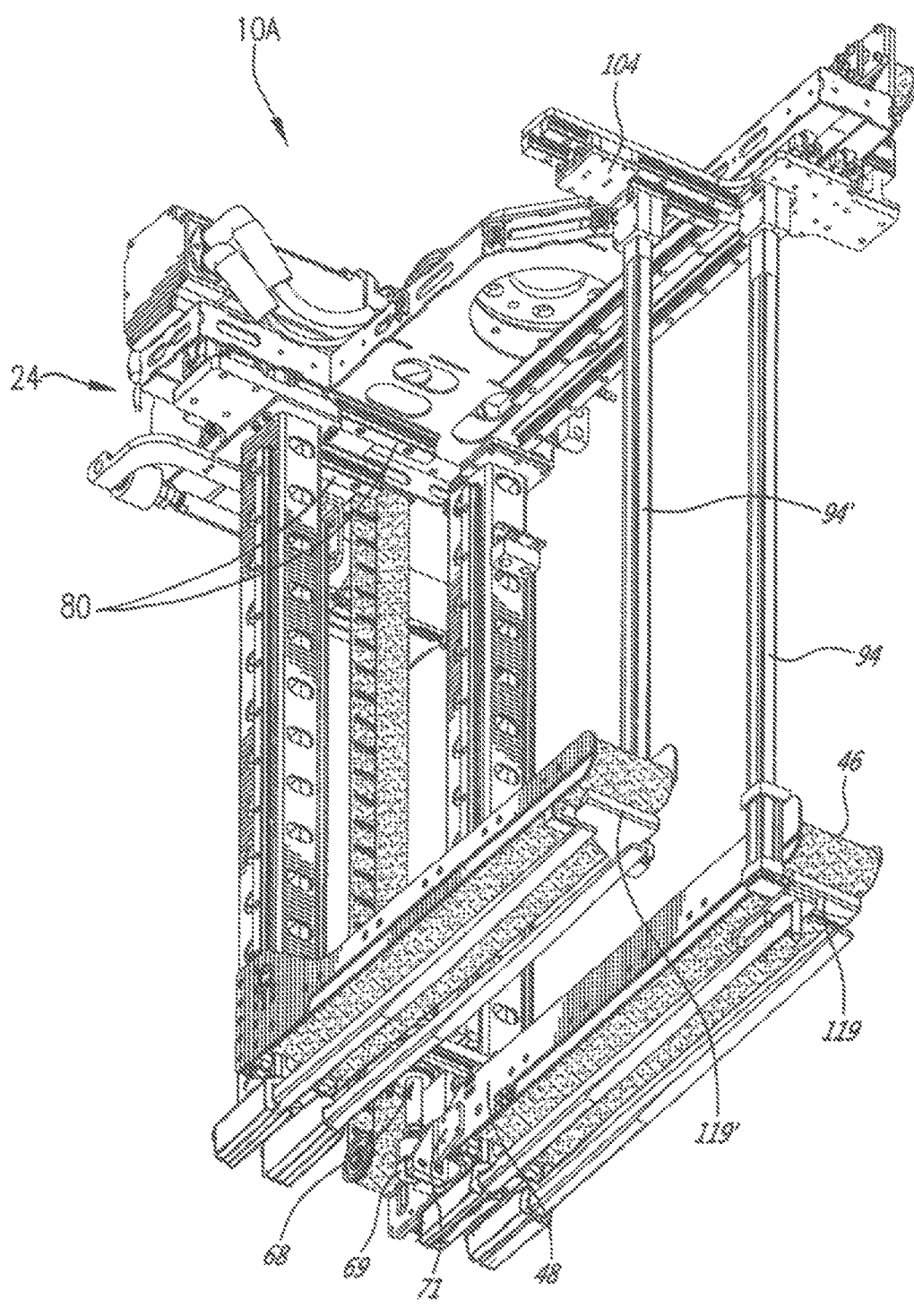
FIG. 3C is a perspective illustration of the tool of FIG. 2 in accordance with aspects of the present disclosure.
Figure 4:
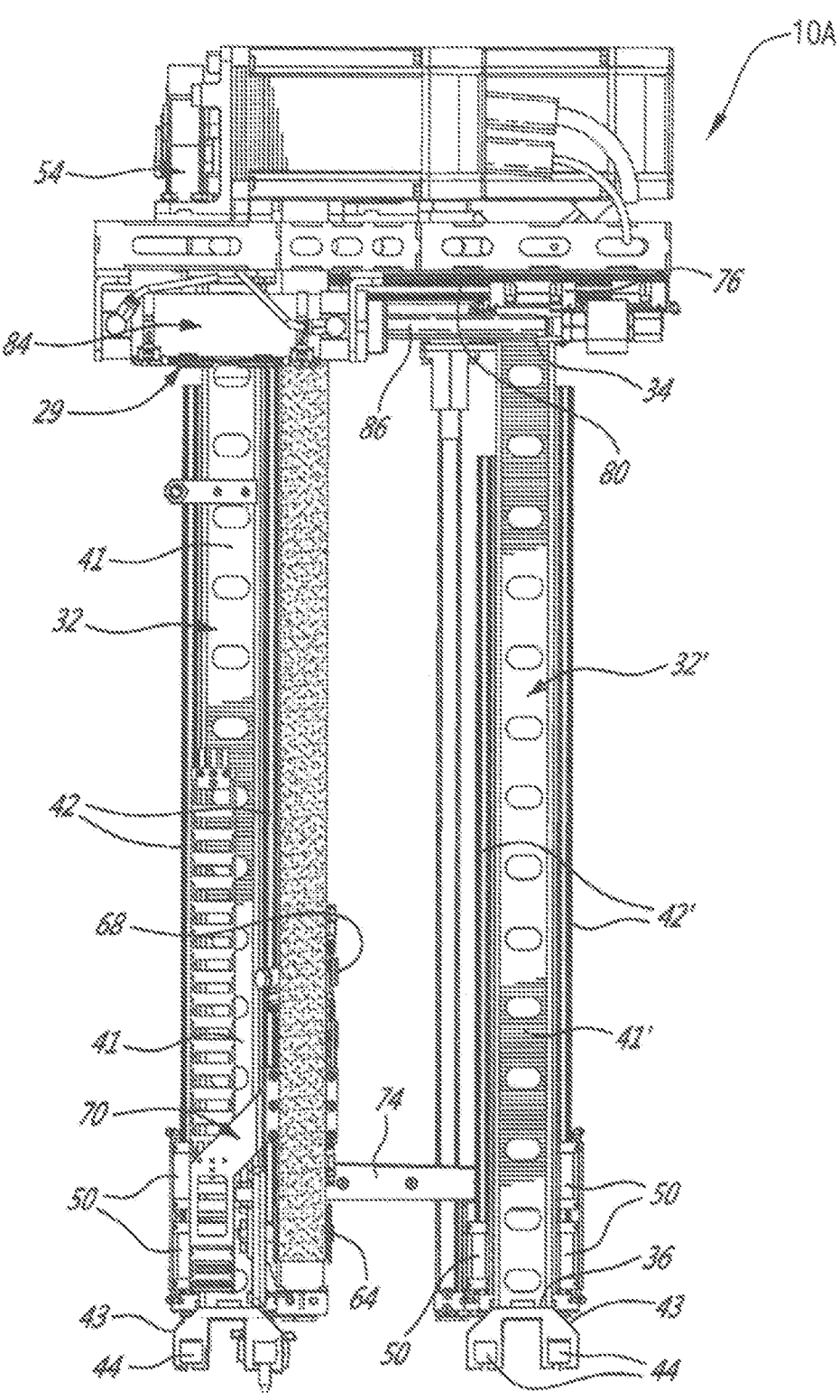
FIG. 4 is a back elevation illustration of the tool of FIG. 2 in accordance with aspects of the present disclosure, the tool being shown in the same configuration of FIG. 3.

The width-adjusting assembly 29 includes top and bottom cursors 76 and 78 (FIGS. 2 and 4) that receive respective horizontal tracks 80 and 75 (FIGS. 2, 3C, and 4). The track 75 is fastened to the horizontal bar 74. The top horizontal tracks 80 are fixedly mounted to the frame 24 thereunder and the top cursor 76 is slidably mounted to the tracks 80 and fixedly mounted to the movable post 41'. The bottom track 75 is fixedly mounted to the gripping member 40 and the bottom cursor 78 is fixedly mounted to the other gripping member 40' and slidably mounted to the track 75. A slot 82 is provided in the exterior side plate 48 of this other gripping member 40' to allow passage for the horizontal bar 74 and bottom track 75 when the movable gripping member 40' is moved towards the other gripping member 40. The width-adjusting assembly 29 further includes a pneumatic cylinder 84 mounted to the frame near the fixed post 41. Extending or retracting the cylinder rod 86 allows modifying the width of the tool 10A. While the width-adjusting assembly 29 is described and illustrated, in one or more aspects (such as illustrated in FIG. 9) the width-adjusting assembly is omitted and spacing (e.g., lateral pitch) between the support members 44 is fixed. The fixing of the lateral pitch between support members 44 at least in part facilitates improving the time optimization of the tool trajectories/movements.

The pusher assembly 28 will now be described in more detail. The pusher assembly 28 has a high stiffness (e.g., effected at least in part by the pusher bars) that is based on maintaining free clearance between telescoping portions of the pusher bars (as described herein) for ease of telescoping/releasing the pusher bars to collapse freely (with respect to the a top of the pusher bar) with support member 44 rotation/camming about axis 296 from impact with an object (As described herein). The pusher assembly 28 includes one or more pusher(s) or pusher bar(s) 94, 94' that is/are mounted to the frame 24 for longitudinal movement in direction 294 (FIG. 2) along the support member 44. The pusher bars 94, 94' may have any suitable configuration including but not limited to square bars, round bars, tubes, elongated "U" shaped channel bars, "I" beams, an elongated boxed frame (see pusher assembly 28A in FIG. 5) similar to that described herein with respect to frame 24, a latticed frame (see pusher assembly 28A in FIGS. 13B and 13C) similar to that described herein with respect to frame 24, and/or any other suitable configuration or combinations thereof for effecting the structure and functions of the pusher bars described herein. The pusher assembly a pusher actuator or second drive assembly 88 that has position compliance similar to that of the first drive assembly 54. As will become apparent upon reading the following description, the pusher assembly 28 defines a product abutment, that extends generally perpendicularly to both the fork assemblies 38, 38' and the gripping members 40, 40' so as to extend between the fork assemblies 38, 38' and the gripping members 40, 40'. The pusher bars 94, 94' have a longitudinal position along the fork assemblies 38, 38' that is movable in unison with the displacement of the tool 10A in an opposite direction thereof so as to move the pusher bars 94, 94' over the support surface 44S.

The pusher assembly 28 includes a third track assembly 90, including tracks 96 that extend generally parallel to the fork assemblies 38,38', two pusher bars 94, 94' that are mounted to the tracks 96 via a pusher bar holder 92, and a second drive assembly 88 for moving the pusher bar holder 92 along the tracks 96.

The pusher bar holder 92 is slidably mounted to the tracks 96 via a cursor 102 fixed to the pusher bar holder 92. The holder 92 includes tracks 98 that are oriented perpendicular to the gripping members 40-40'.

The proximate end 87 of the pusher bar 94 is fixedly mounted to the pusher bar holder 92. The proximate end 87' of the pusher bar 94' is slidably mounted in the tracks 98 via a cursor 104 for movement therealong. The pusher bars 94 are further slidably mounted to the inner side plate 48 of the gripping member 40 via hollow brackets 91 for free movement along the gripping members 40-40' and also so as to allow transversal movement of the gripping members 40-40' along the pusher bars 94-94'. The brackets 91 are slidably mounted to the inner side plates 48.

The distal ends 89 of the pusher bars 94 are provided with support members 93 that extend laterally from the pusher bars 94-94', perpendicularly therefrom in opposite directions. The length of these two support members 93 are such that they do not extend beyond the forks 38 and gripping members 40 when the gripping member 40' and fork 38' are positioned closer to the other corresponding assembly 40 and fork 38. In one aspect, the pusher assembly 28 is also configured so as to be compliant or conformal to the displacement position of the support surface 44S as will be further described herein. For example, referring briefly to FIGS. 13 and 13A, at least a portion 1350 of the pusher bars 94, 94' of the pusher assembly 28 may be telescoping relative to another portion 1355 of the pusher bars 94, 94' so that the telescoping portion 1350 moves in direction 298 along a linear slide 1370 formed by or coupled to the another portion 1355 of the pusher bars 94, 94'. Here, the telescoping portion 1355 of the pusher bars 94, 94' is compliant with respect to and allows for free movement of the support members 44 about pivot axis 296 in response to contact with an object 1300 (see FIGS. 13, 13A, 13B, and 13C).

As noted above, in one aspect, the second drive assembly 88 includes position compliance or conformance device 310. In one aspect, the position compliance device 310 may be included in the drive 106 of the second drive assembly 88. For example, the second drive assembly 88 includes a drive 106 having a torque limiting device 311 an output shaft provided with a pulley 107 that is operatively coupled to an endless belt 109. The torque limiting device 310 may be any suitable mechanical or electrical device that limits torque of the drive 106, such as a mechanical spring loaded friction clutch, a spring loaded splined clutch, an electromotive force (EMF) feedback in the first drive 56 that senses increased current and activates an electronic clutch, etc.). The endless belt 109 is coupled to the pulley 111. A roller 108, that is secured to the frame 24, is provided to tension the belt 109. The pulley 111 is coupled to the pulley 113 via the coupling shaft 112, who is coupled to the timing belt 115. The other end of the endless belt 115 is mounted to a pulley 114 that is rotatably mounted to the frame 24 via a mounting bracket 116. The cursor 102 is attached to the belt 115 via a clipping assembly 118 for movement of the holder 92 in unison with the belt 115.

In operation of the pusher assembly 28, the longitudinal position of both pusher bars 94, 94' along the gripping members 40, 40' is controlled by the drive 106, the bar 94' moves laterally in unison with the gripping member 40' when the width of the tool 10A is adjusted for the width or length of the product 12 to pick, and the gripping members 40, 40' are free to move along the pusher bars 94-94' to adjust for the height of the product 12. When the pusher assembly 28 is moved by the second drive assembly 88, the belts 46 follow the movement of the pusher assembly 28 in unison. The pusher bars 94, 94' are attached to the belts 46 with clipping assemblies 119 and 119' (see on FIG. 3C).

With reference to FIGS. 5-8, another tool 10B for palletizing mixed load products will be described in accordance with aspects of the present disclosure. The tool 10B is substantially similar to tool 10A described above except were otherwise described.

In this aspect, the tool 10B includes fork assemblies 38, 38' each having one or more support member 44. The fork assemblies 38, 38' are mounted to the frame 24A via tapered beams 148, 150 so as to extend perpendicularly therefrom. The center beam 150 is fixedly mounted to the frame 24A and the two side beams 148 are mounted to the frame 24A for lateral movement in direction 700 relative to the center beam 150. More specifically, the beams 148 are mounted to tracks 152 and their lateral distance 701 from the center beam 150 can be modified via the actuators 154 (e.g., compare the distance 701 in FIGS. 7 and 8). In one aspect, each of the actuators 154 includes a position compliance device substantially similar to those described above.

Figure 13B:
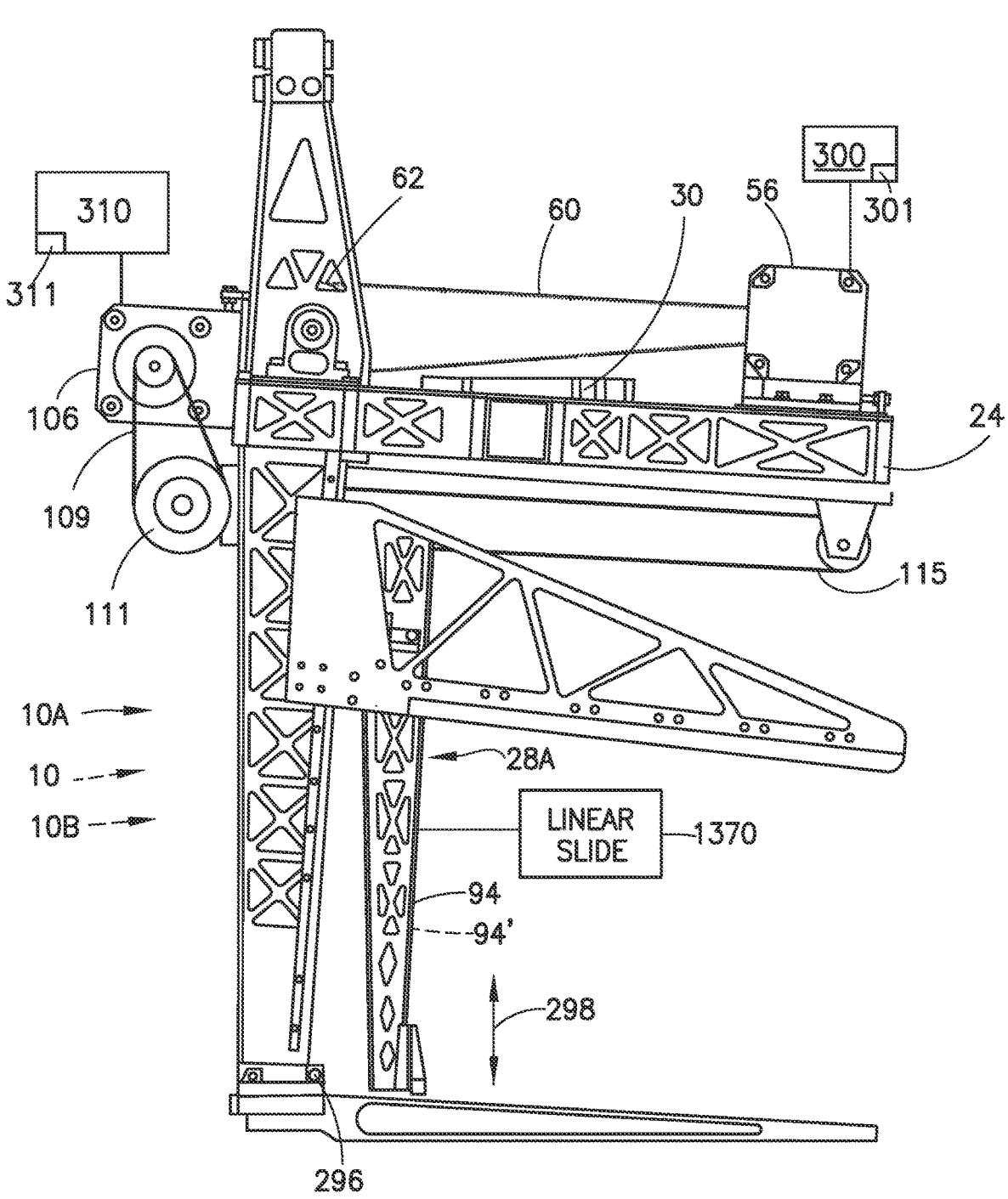
FIG. 13B is a side elevation illustration of a tool that is representative of the tools of both FIGS. 2 and 5 in accordance with aspects of the present disclosure.
Figure 13C:
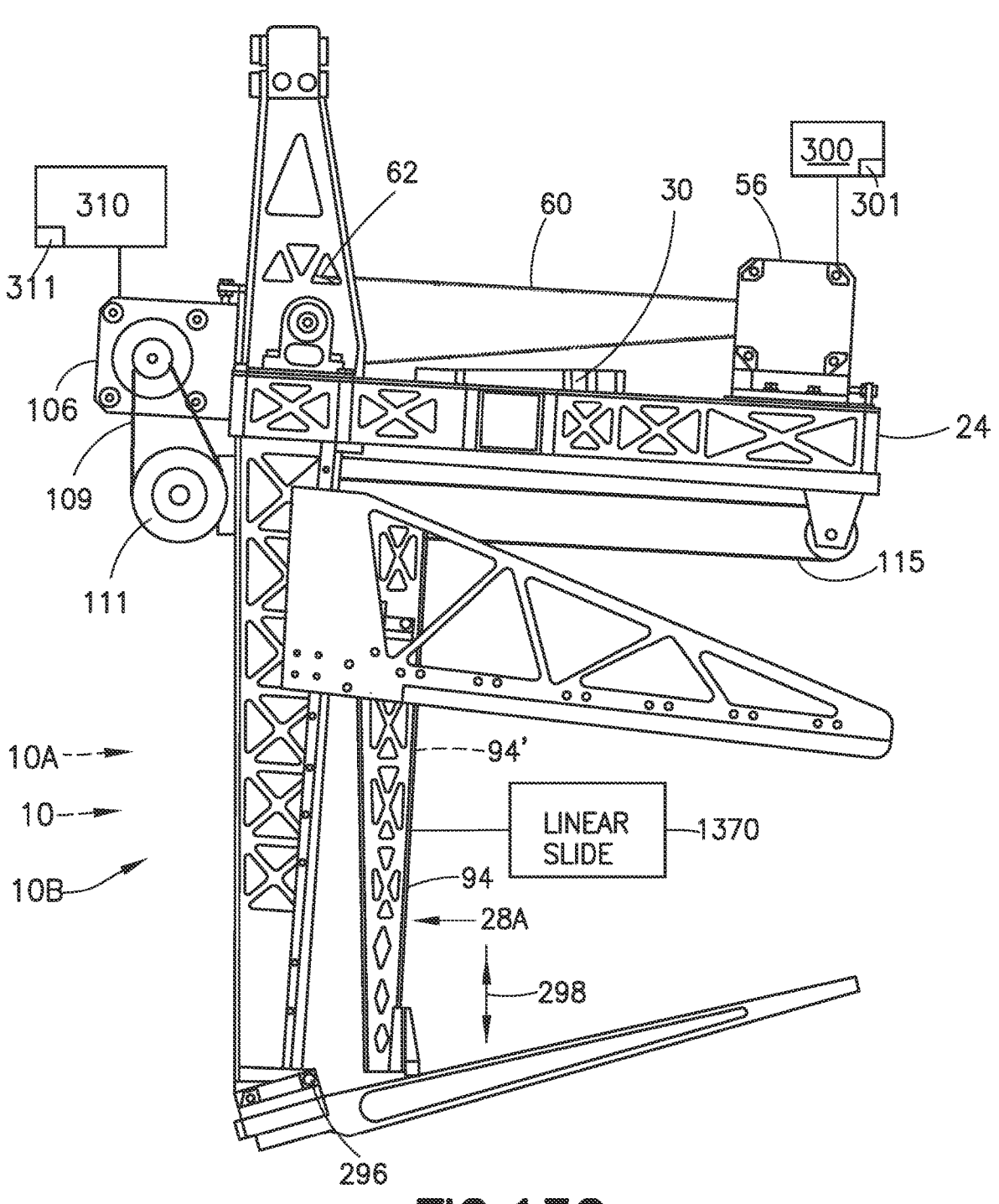
FIG. 13C is a side elevation illustration of a tool that is representative of the tools of both FIGS. 2 and 5 in accordance with aspects of the present disclosure.

The tool 140 further comprises a pusher assembly 28A that may be similar to pusher assembly 28 described above, however in this aspect the pusher bars 94, 94' are in the form of a boxed frame (FIG. 5) and/or latticed frame (FIGS. 13B, 13C). The pusher assembly 28A is mounted to the frame 24A via a track 158 for slideable movement along the center support member 44. The displacement of the pusher assembly 28 is driven by a first drive assembly 162 that includes first drive 164, first endless belt assembly 166 and associated pulleys. The first drive 164 may include a position compliance or conformance device 600 having a torque limiting device 301. The torque limiting device 601 may be any suitable mechanical or electrical device that limits torque of the first drive 56, such as a mechanical spring loaded friction clutch, a spring loaded splined clutch, an electromotive force (EMF) feedback in the first drive 56 that senses increased current and activates an electronic clutch, etc.).

A pad 176, that forms a gripping element with one or more of the support members 44, is mounted to the pusher assembly 28A via a track 171 for slideable movement therealong in direction 298. The longitudinal movement of the pad 176 in the track 171 is driven by a second drive assembly 168 that includes a second drive 170, a spline shaft 160, an endless belt assembly 172 and actuator 174. In one aspect, the second drive 170 includes a position compliance or conformance device 500 in a manner similar to that described above. The position compliance device 500 includes a torque limiting device 501, which may be any suitable mechanical or electrical device that limits torque of the second drive 170, such as a mechanical spring loaded friction clutch, a spring loaded splined clutch, an electromotive force (EMF) feedback in the first drive 56 that senses increased current and activates an electronic clutch, etc.).

In one aspect, the pusher assembly 28A is also configured so as to be compliant or conformal to the displacement position of the support surface 44S as will be further described herein. For example, at least a portion 1350 of the pusher assembly 28A (such as the pad 176 and/or the track 171 and its housing) may be telescoping relative to another portion 1355A of so that the telescoping portion 1350A moves in direction 298 along a linear slide 1370A (telescoping motion being effected in part by the position compliance device 500) that is provided by or coupled to the another portion 1355A of the pusher assembly 28A. Here, the telescoping portion 1355A is compliant with respect to and allows for free movement of the support members 44 about pivot axis 296 in response to contact with an object 1300 (see FIGS. 13, 13A, 13B, and 13C).

Referring to FIGS. 2, 5, 9, and 10 an exemplary support assembly coupling 295 between the mounting bracket 43 and the support member(s) 44 of the tools 10A, 10B will be described in accordance with aspects of the present disclosure. The support assembly coupling 295 to the frame 24, 24A is positionally deterministic so that the support assembly coupling 295 deterministically positions the support member 44 in the actuation direction 298 in a predetermined position with the support surface 44S at the predetermined reference orientation relative to the frame 24, 24A, and that is movably released in a released direction 297 different than the actuation direction 298 so that the support member 44 is substantially freely movable relative to the frame 24, 24A in the released direction 267 away from the predetermined position.

The movably released configuration of the support member 44 provides for the support member 44 to be movable substantially freely relative to the frame 24, 24A in at least the released direction 297 with the gripping assembly 26, 26A in a condition other than clamped wherein the product 12 is gripped by the support surface 44S and the grip press 251, 251A. In one aspect, the support assembly coupling 295 has a pivot or otherwise compliant coupling 950 disposed between the support member 44 and the frame 24, 24A that defines the motion release of the support assembly coupling 295 so that the support member 44 is movable relative to the frame 24, 24A in the released direction 297. For example, the mounting bracket 43 is coupled to the frame 24, 24A in any suitable manner so as to pivot about pivot axis 296 so that compliance of the support member 44 moves the support surface 44S relative to the frame 24, 24A in the released direction 297 away from the predetermined position. The compliant coupling 950 is configured so that the support member 44 is compliant independent of whether the tool 10A, 10B is in a gripping condition, wherein the product is gripped by the support surface 44S and the grip press 251, 251A, and an ungripping condition, wherein the product 12 is not gripped or the tool 10A, 10B does not have a product 12 thereon.

As described above, the pivoting movement of the mounting bracket 43 is arrested by one or more stop surfaces 900-903 (FIG. 9) of one or more of the mounting bracket 43 and posts 41, 41' (the tapered beams 148, 150 of FIGS. 5-8 may have a similar configuration to that of the posts 41, 41'). In one aspect, the stop surfaces 900 of the mounting bracket 43 contact stop surface 902 of the respective post 41, 41' to arrest rotational (here, clockwise) movement of the support members 44 in direction 297 and set the predetermined reference orientation. In another aspect, the stop surface 901 of the respective post 41, 41' contacts stop surface 903 of the mounting bracket 43 to arrest rotational movement of the support members 44 in direction 297 and set the predetermined reference orientation. In other aspects, any suitable combination of stop surfaces 900-903 may be used to arrest rotation movement of the support members 44 in direction 297 to set the predetermined reference orientation; while in still other aspects the predetermined reference orientation may be set in any suitable manner. It is noted that the support members 44 and mounting brackets 43 may be held in the predetermined reference orientation by virtue of the cantilevered weight of the support members 44. For example, the support members 44 are cantilevered from the mounting bracket 43 so that a force 277 is generated by the weight of the support members 44 on one side of the pivot axis 296 so that the support members 44 and mounting brackets 43 are be held in the predetermined reference orientation.

Referring also to FIGS. 13, 13A, 13B, and 13C, the movably released configuration of the support member 44 provides for movement of the support member 44 in the released direction 297, such as upon contact with an object 1300 so as to substantially prevent flexing of the support member 44. For example, the support surface 44S moves substantially freely in the released direction 297 by contact of the object 1300 against the support member 44 in a contact direction 1310 aligned at least in part with the released direction 297 (e.g., so as to produce a moment 296M (FIG. 13A) about the pivot axis 296), which contact of the object 1300 against the support member 44 is generated by relative motion between the support member 44 and the object 1300 (e.g., such as during a movement or palletizing motion along paths 197-199 of the tool 10A, 10B by the robot arm 14 (see FIG. 1). Here, movement of the support member 44 about the pivot axis 296 is an unpowered (i.e., passive) movement. In one aspect, such as in FIG. 13 with for example the tool 10, 10A, 10B "empty" (i.e., not carrying a product), the object 1300 is the product 12; or in other aspects, such as in FIG. 13A with for example the tool 10, 10A, 10B carrying a product 12, the object 1300 is a different product 12A disposed at least at one of a product pick station 16P (e.g., such as of the infeed conveyor 16), that holds the product for picking by the tool, and any suitable portion of the palletizer cell 15. In still another aspect, with respect to FIGS. 13, 13A, 13B, and 13C, the object 1300 is a structure from at least one of a structure of a product pick station 16P (e.g., such as the infeed conveyor 16 or any portion thereof), that holds the product for picking by the tool, a structure of a palletizer cell 15 (e.g., a robot support structure, conveyors, etc.), and a structure (e.g., pallets, products, etc.) seated on at least part of the palletizer cell 15.

As noted above, and referring to FIGS. 2, 13A, and 13C, the grip press 251 and or the portion of the pusher bars 94, 94' are compliant with movement of the support members 44 about pivot axis 296. For example, as shown in FIG. 13A the grip press 251 may move in direction 298B in response to movement of the support members 44 in direction 297 resulting from contact between the support members 44 and the object 1300. The position compliance device 300 of the first drive assembly 54 (which drives movement of the grip press 251 in direction 298) may yield to forces exerted on the gripping members 40, 40' of the grip press 251 by the product 12 held on the support surface 44S of the support members 44, while maintaining grip on the product 12, and allow for compliant movement of the grip press 251 in direction 298B. The compliance device 500 in FIG. 5 may operate in a manner similar to that described above with respect to compliance device 300 to provide the pad 176 with compliance similar to that of the grip press 251. Similarly, the compliance device 310 of the second drive assembly 88 that drives the pusher bars 94, 94' may provide compliance of the pusher bars 94, 94' in direction 1333 (FIG. 13A) in response to movement of the support members 44 in direction 297 (and movement of the product 12 held thereon) resulting from contact between the support members 44 and the object 1300. For example, as the support members 44 pivot about pivot axis 296 in response to contact with the object, the product 12 may move in direction 1333, and as such the product 12 may push against the pusher bars 94, 94'. The compliance device 310 allows movement of the pusher bars 94, 94' in direction 1333 in response to movement of the product 12 effected by the rotation of the support members 44 about pivot axis 296. The compliance device 600 in FIG. 5 may operate in a manner similar to that described above with respect to compliance device 310 to provide the pusher assembly 28A with compliance similar to that of the pusher assembly 28. As such, the position compliance devices 300, 500 of the drive assemblies 54, 168 accommodates displacement of respective ones of the grips (e.g., grip press 251 or pad 176) (i.e., the gripping force in the grip direction) and the position compliance devices 310, 600 of the drive assemblies 88, 162 accommodates displacement of the respective pusher bars of the pusher assemblies (i.e., pushing force in the pushing direction).

Figure 5:
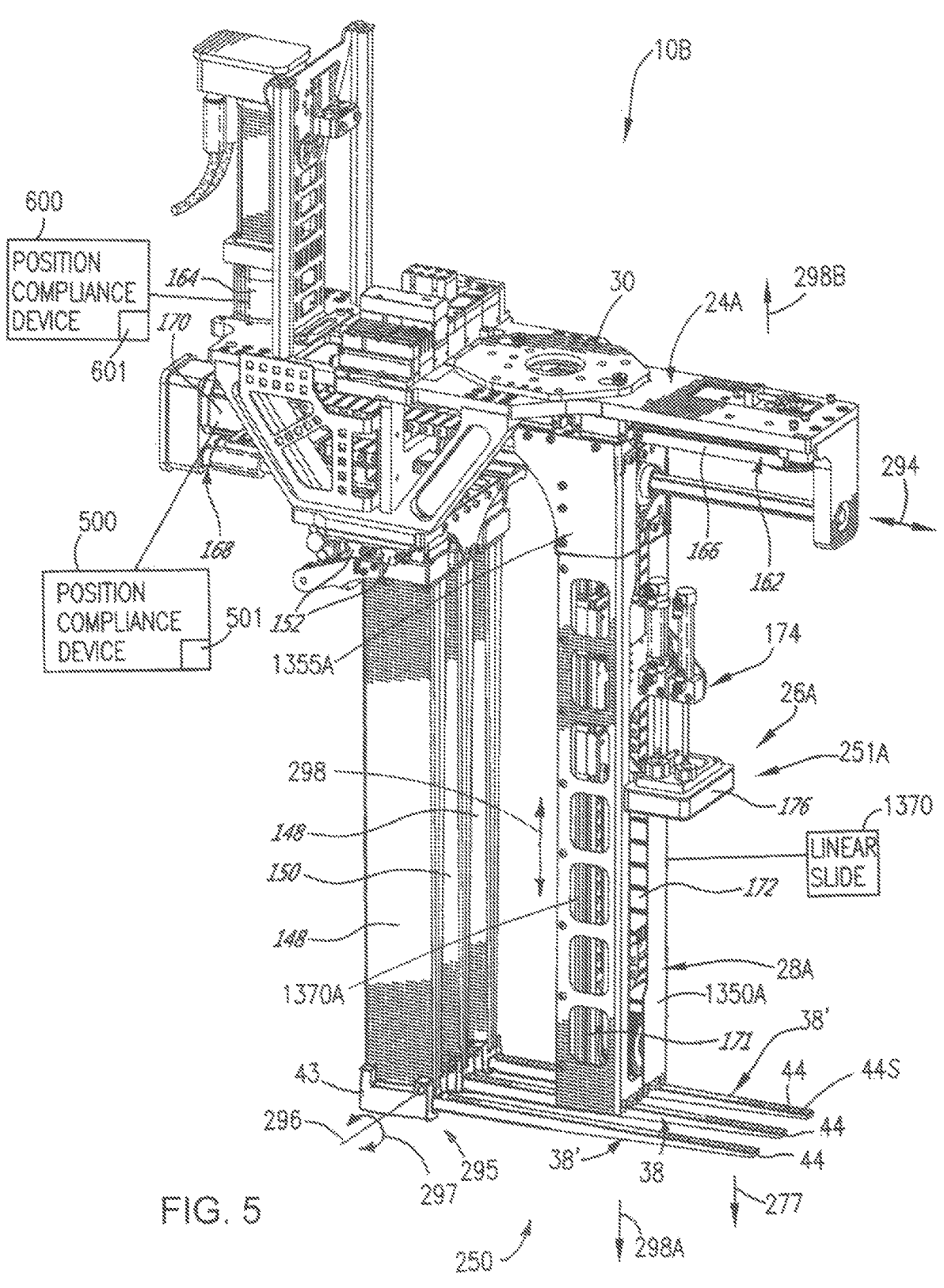
FIG. 5 is a perspective illustration of a tool for mixed load palletizing incorporating aspects of the present disclosure.
Figure 6:
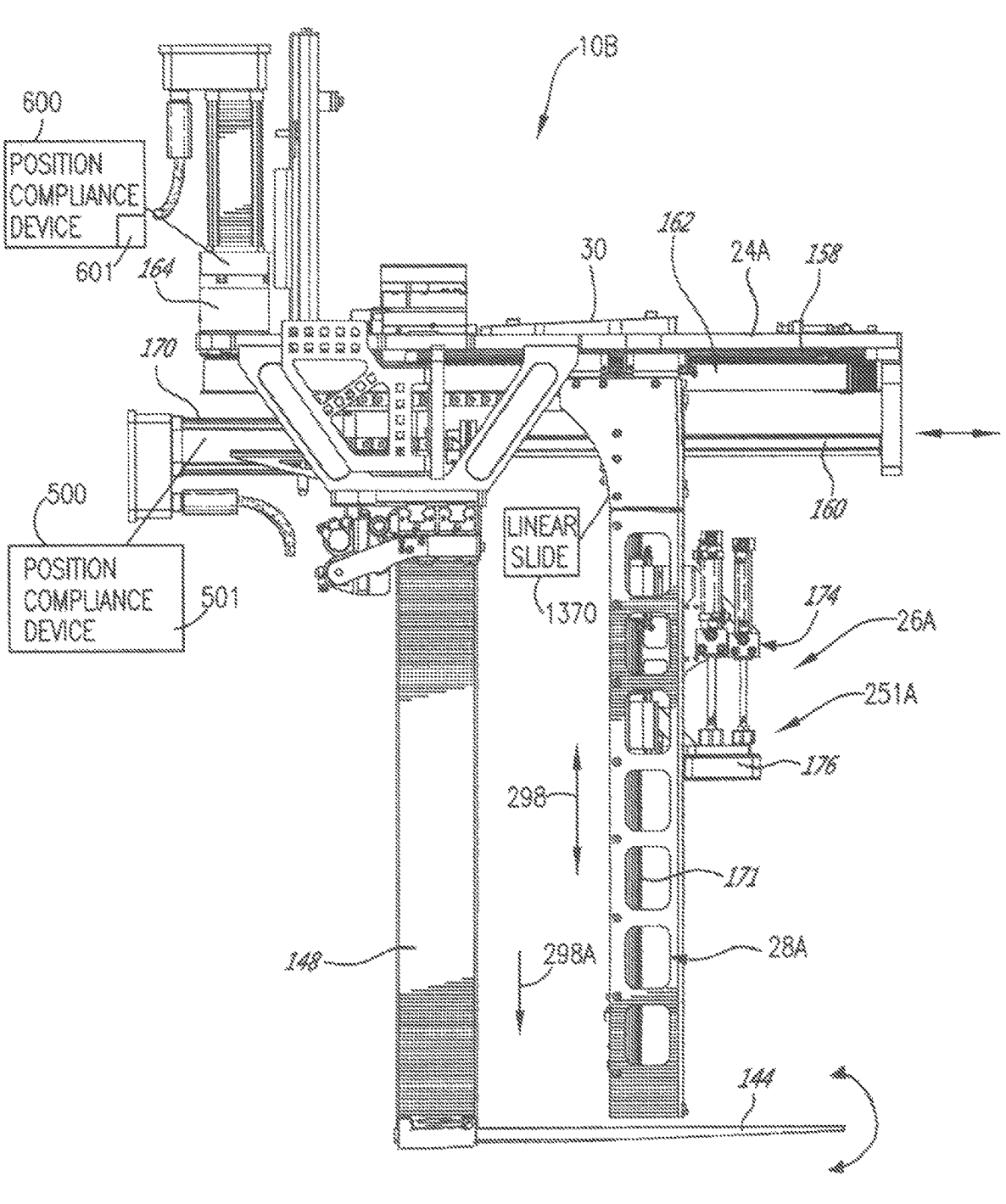
FIG. 6 is a side illustration of the tool of FIG. 5 in accordance with aspects of the present disclosure.
Figure 7:
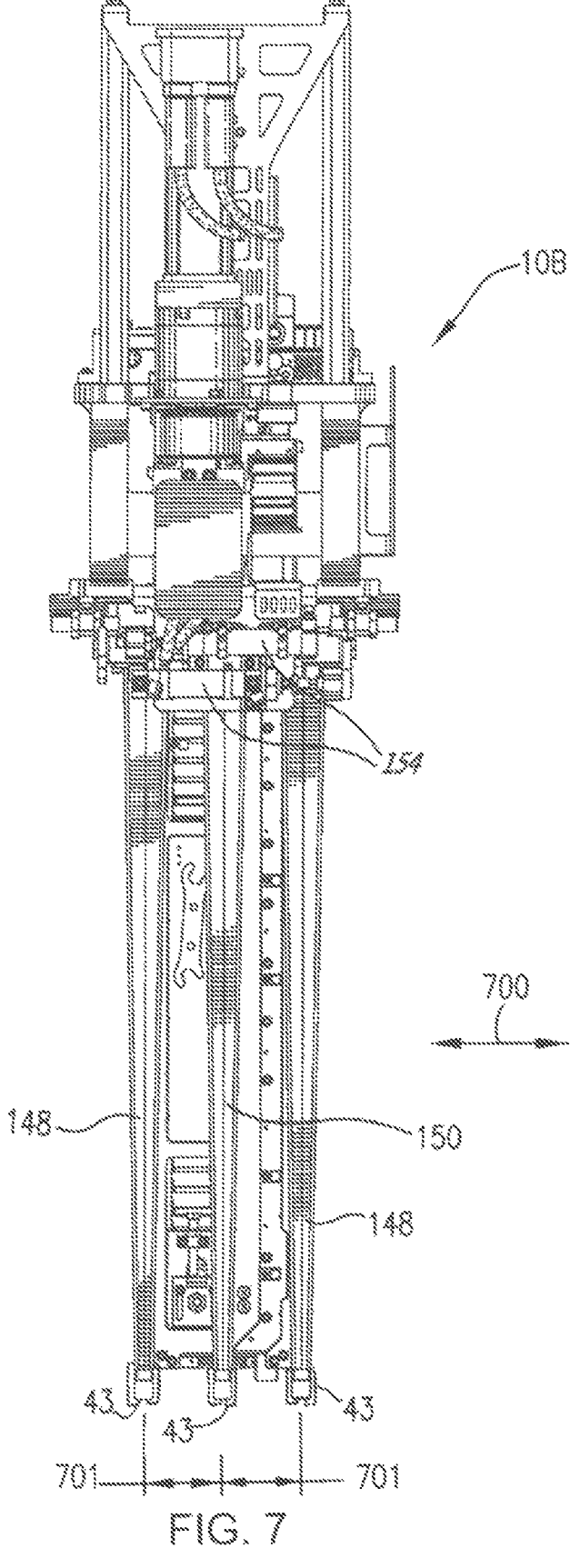
FIG. 7 is a back elevation illustration of the tool of FIG. 5 with forks shown in a narrow configuration in accordance with aspects of the present disclosure.
Figure 8:
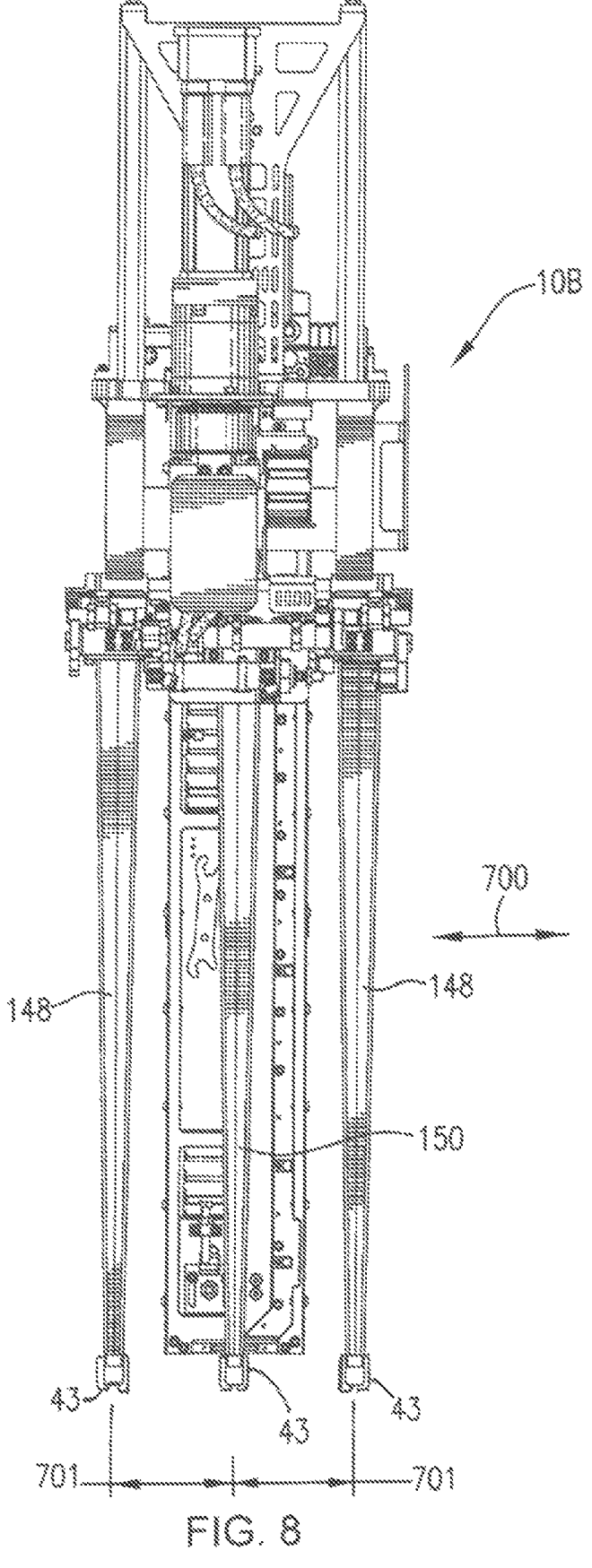
FIG. 8 is a back elevation illustration of the tool of FIG. 5 with forks shown in a wide or extended configuration in accordance with aspects of the present disclosure.

Further, the telescoping portions of the pusher bars telescope in compliance to movement of the support members 44 about pivot axis 396 as described herein. Referring to FIGS. 2, 5, and 13 as noted above, in one aspect, the tools 10A, 10B include a compliant pusher assembly 28, 28A. It is noted that while tool 10A is illustrated in FIG. 13, the pusher assembly 28A of tool 10B may be similarly configured. In one aspect, at least a portion 1350 of the pusher bars 94, 94' of the pusher assembly 28 may be telescoping relative to another portion 1355 of the pusher bars 94, 94' so that the telescoping portion 1350 moves in direction 298 along a linear slide 1370 formed by or coupled to the another portion 1355 of the pusher bars 94, 94'. Here, the telescoping portion 1355 of the pusher bars 94, 94' is compliant with respect to and allows for free movement of the support members 44 about pivot axis 296 in response to contact with the object 1300. For example, movement of the support members 44 (and the support surface 44S thereof) in released direction 297 about pivot axis 296 in response to contact with the object 1300 causes telescoping portion 1355 of the pusher bars 94, 94' to move in direction 298 towards the robot-mounting bracket 30 of the tool 10A so as to allow movement of the support member 44 about pivot axis 44 away from the predetermined reference orientation. While a telescoping compliance is described and illustrated with respect to FIG. 13, it should be understood that any suitable compliance (e.g., bending, pivoting, etc.) maybe provided by the pusher assembly 28, 28A so as to allow movement of the support members 44 in direction 297 away from the predetermined reference orientation substantially without interference from the pusher assembly 28, 28A.

In one aspect, the support member 44 may be constructed of any suitable phenolic materials such as, including but not limited to, thermoset glass-reinforced (fiber-epoxy) laminates. A suitable example of a thermoset glass-reinforced (fiber-epoxy) laminate is Garolite® G10/FR4. The phenolic materials may provide a resiliency to the support members 44 that allows the support member 44 to elastically flex while returning to its original configuration after contact with an object 1300. In other aspects, the support member 44 may be constructed of any suitable metal, plastic, or other material having sufficient mechanical properties to support the products 12 for palletization.

Figures 10, 10A:
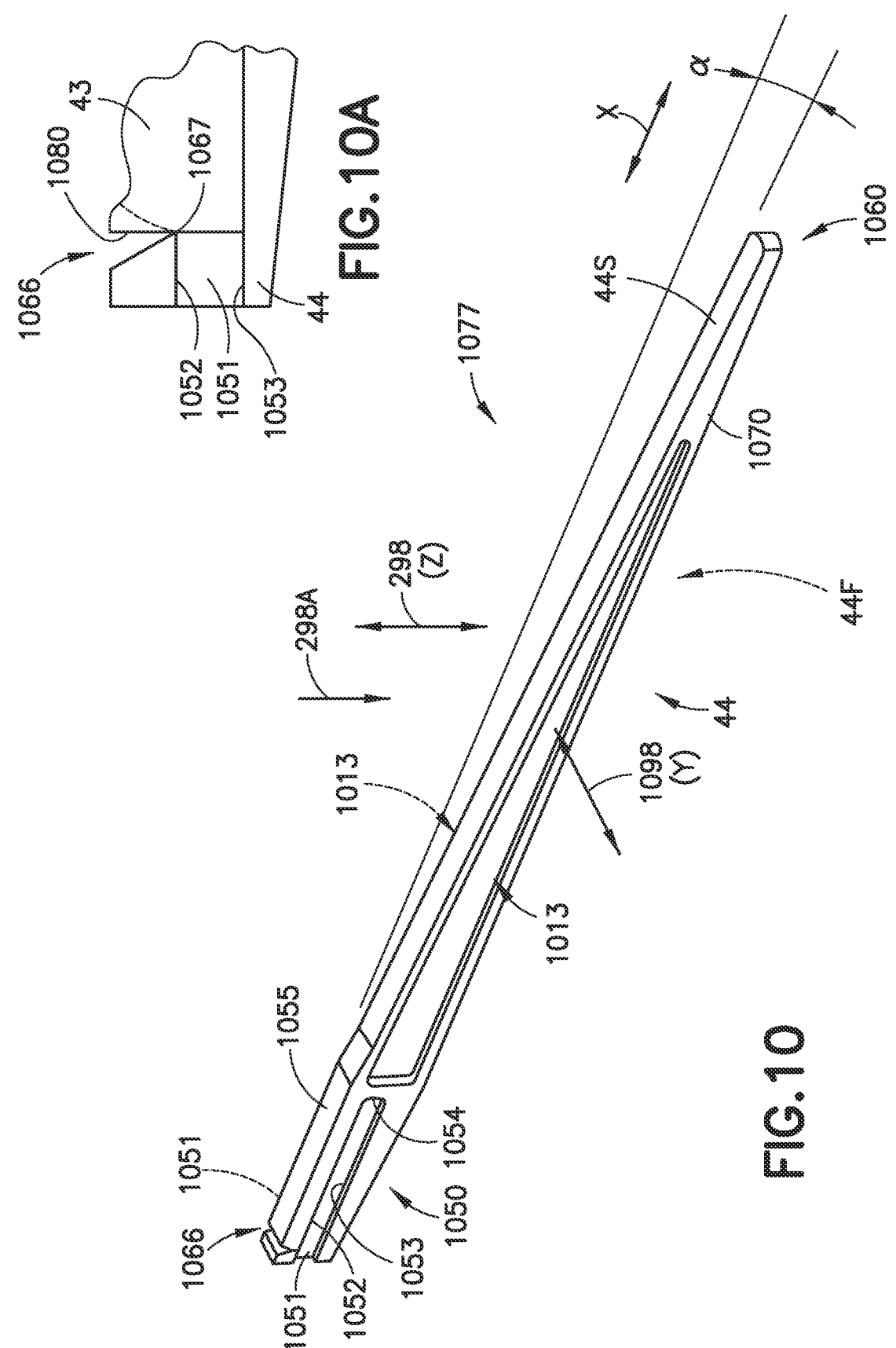
FIG. 10 is a perspective illustration of a fork of the tools of FIGS. 2 and 5 in accordance with aspects of the present disclosure.
FIG. 10A is a plan view of a portion of a the tools of FIGS. 2 and 5 in accordance with aspects of the present disclosure.
Figure 10B:
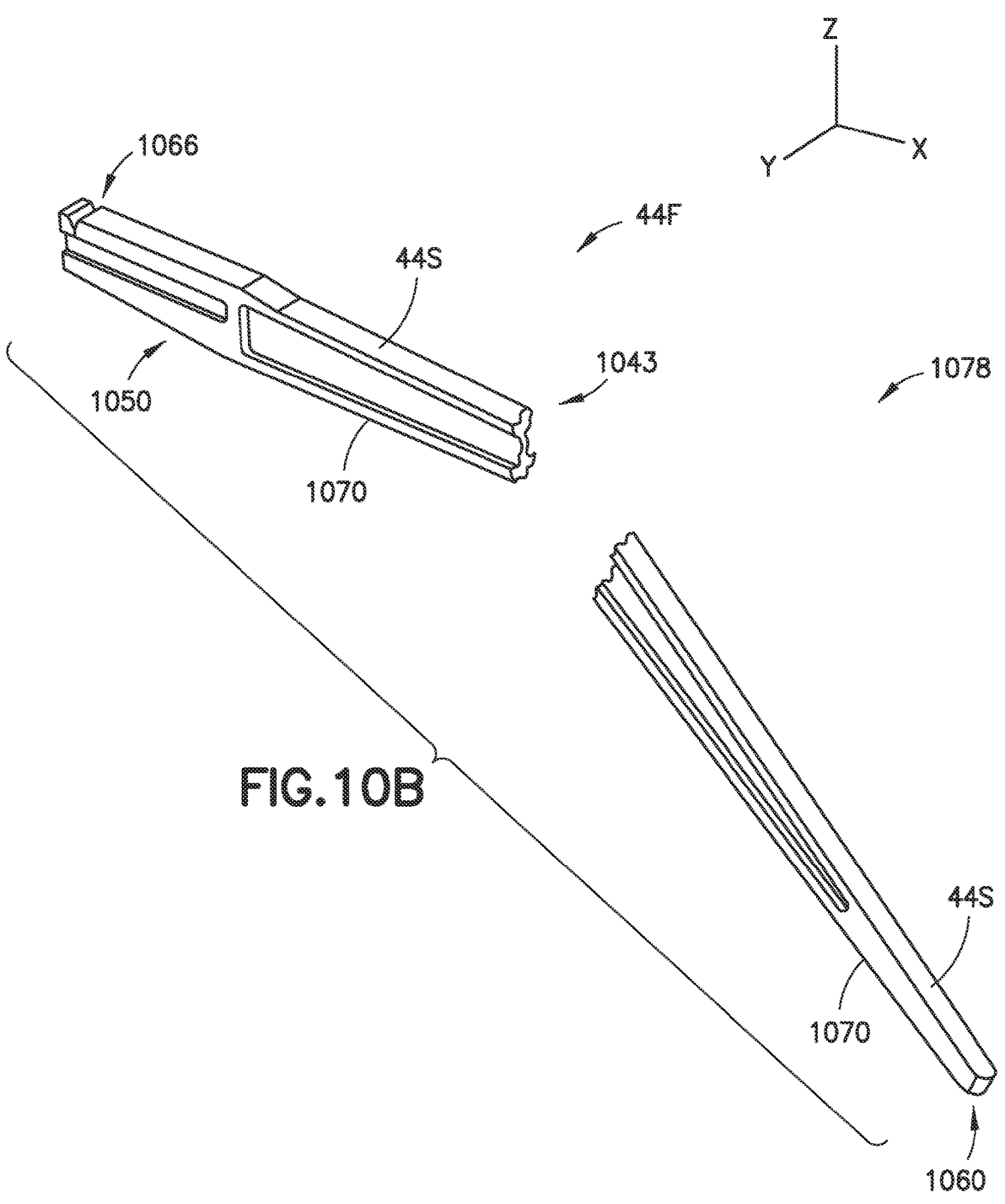
FIG. 10B is a perspective illustration of a fork of the tools of FIGS. 2 and 5 in accordance with aspects of the present disclosure.
Figure 12:
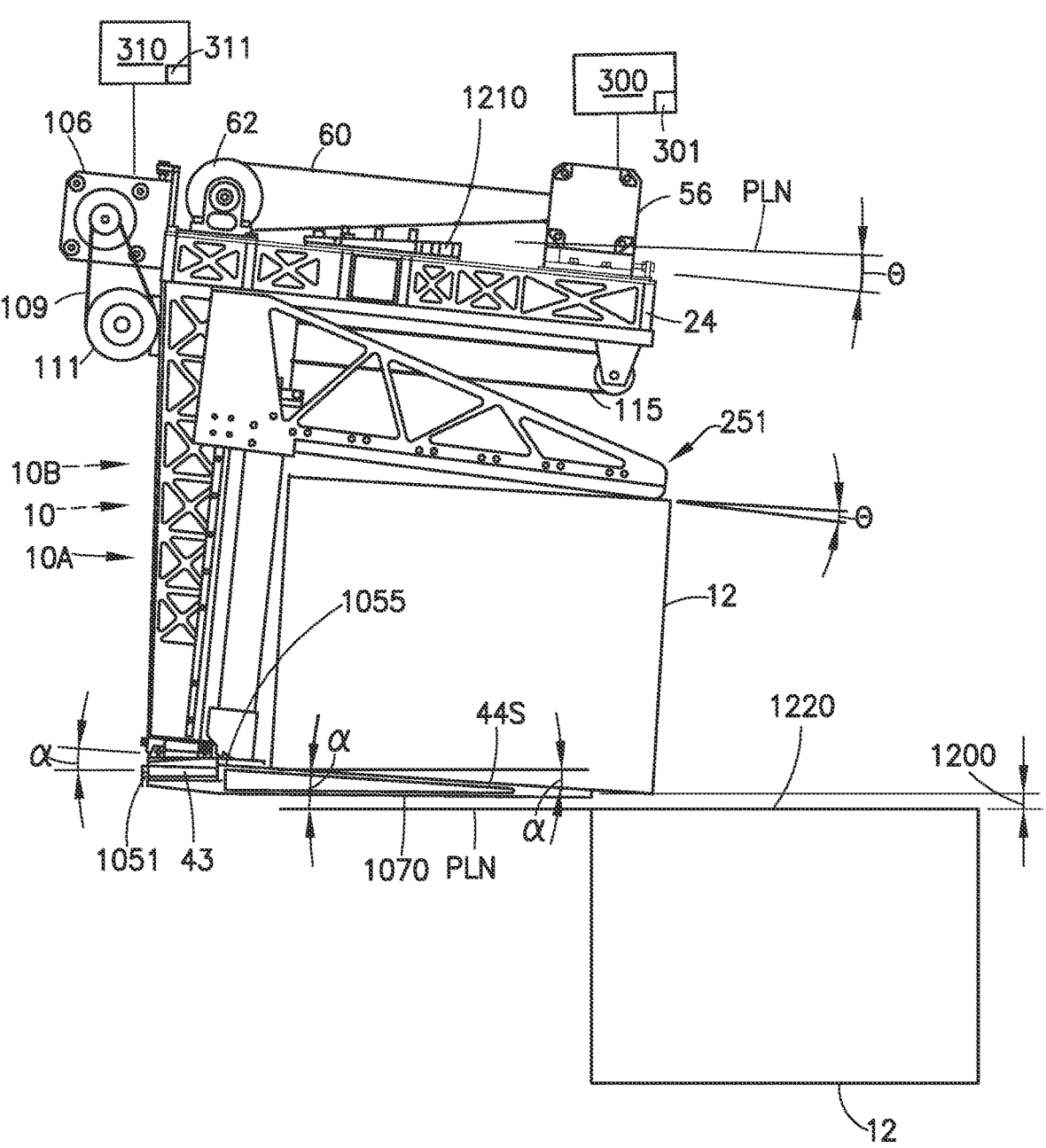
FIG. 12 is a side elevation illustration of a tool that is representative of the tools of both FIGS. 2 and 5 in accordance with aspects of the present disclosure.

In some aspects, the support member 44 is a frangible support member 44F (that is otherwise substantially similar to support member 44 except where noted) that has an un-ductile material characterized in that the frangible support member 44F is substantially undeformed and the support surface 44S is substantially invariant, from a predetermined reference orientation (such as shown in FIGS. 2 and 12), from strikes of the support assembly 250 against an obstruction or object 1300 (FIG. 13) with the tool 10, 10A, 10B moved along one or more paths 197-199 (see FIG. 1) by the robot arm 14, and in that the frangible support member 44F remains substantially undeformed, the support surface 44S substantially invariant, onto fracture of the frangible support member 44F on impact with the obstruction or object 1300 that causes the fracture, which fracture disrupts the support surface 44S from the predetermined reference orientation, so as to provide the support surface 44S with but two states, a substantially invariant state 1077 (as shown in FIG. 10) and a disrupted state 1078 (as shown in FIG. 10B). The frangible support member 44F fracture provides a predetermined, substantially immediate, indication or indicia 1403 to an operator of the palletizer cell 15 of disruption of the support surface 44S. For example, as shown in FIG. 10B a portion of the frangible support member 44F separates completely (or in other aspects, partially) from another portion of the frangible support member so as to visibly truncate or visibly create gaps in the support surface 44S. The predetermined indicia 1043 substantially immediately identifies to the operator the disruption rendered the support surface 44S unsuitable for seating a product 12 thereon. The frangible support member 44F is configured so as to define the predetermined indicia 1043 that provides the substantially immediate indication of the disrupted state 1078, wherein the predetermined indicia 1043 is intrinsic to fracture of the frangible support member 44F. For example, the indicia 1043 may be any suitable indicia such as a fractured surface, strands of material, or any other suitable visual indicia and/or aural indication that identifies a fracture. It is noted that the robot arm 14 operate under bang-bang (max torque, time optimal) control where the tool 10, 10A, 10B is moved by the robot arm 14 along the paths 197-199 at about 70% to about 90% of maximum robot arm 14 acceleration and at about 50% to about 60% maximum robot arm jerk without product(s) 12 held on the support members 44. With products held on the support members 44 the robot arm 14 may move the tool 10, 10A, 10B along the paths under bang-bang control at about 55% to about 85% of the maximum robot arm 14 acceleration and at about 50% to about 75% maximum robot arm jerk. The support members 44 may encounter an object/obstruction 1300 (FIG. 13) during this bang-bang control movement and elastically deflect and remain invariant on striking objects and otherwise fracture as described herein.

In one aspect, the frangible support member 44F is configured so as to be substantially undeformed and the support surface 44S substantially invariant, from the predetermined reference orientation, from strikes of the support assembly 250 and the obstruction or object 1300 (FIG. 13) with the tool 10, 10A, 10B moved along the path(s) 197-199 by the robot arm 14 commensurate with the predetermined duty cycle of the robot arm 14 palletizing pallets at the palletizer 15. In one aspect, the frangible support member 44F is configured so as to be substantially undeformed and the support surface 44S substantially invariant, from the predetermined reference orientation, from impacts of the support assembly 250 and the obstruction or object 1300 (FIG. 13) with the tool 10, 10A, 10B moved along the path(s) 197-199 by the robot arm 14 commensurate with optimum trajectory motion of the tool 10, 10A, 10B along the path(s) 197-199 between different product pick and place positions (as illustrated in FIG. 1 such as picking from different locations on the infeed conveyor 16 and placing at different positions on the pallet 20) of the tool 10, 10A, 10B in the palletizer 15.

As described herein, support member 44, 44F and the support surface 44S thereof has a proximal end 1050 and a distal end 1060 disposed so that the product 12 is seated (at least in part so as to be stably held) between the proximal end 1050 and the distal end 1060, and the support member 44, 44F is coupled to the frame 24, 24A at the proximal end 1050, and wherein the support surface 44S is has an anhedral angle α, relative to a predetermined level plane PLN (FIG. 12), between the proximal end 1050 and distal end 1060 so that the product 12 seated on the support surface 44S is disposed at the anhedral angle α at discharge from the tool 10, 10A, 10B from the distal end 1060 of the support surface 44S. For example, the support member 44 (inclusive of frangible support member 44F) is coupled to the frame 24 (inclusive of frame 24A) with a coupling 961 (FIG. 9) that is compliant at least in part. In some aspect, the frangible support member 44F is configured so as to fracture on impact with the obstruction or object 1300 (FIG. 13) exceeding compliance of the coupling 961. As an example, the support member 44 (again, inclusive of the frangible support member 44F) is removably joined to the mounting bracket 42 with a sliding joint 920 configured so that the support member 44 and mounting bracket 43 slide relative to each other and the support member 44 is joined and dis-joined to the mounting bracket 43 by relative sliding between the support member 44 and the mounting bracket 43. In one aspect, the support member 44 is removably joined to the mounting bracket 43 by a slot joint 921 that effects a substantially tool-less fast swapping of one support member with another support member (such as for replacement), where the tool-less fast swapping may be referred to as sliding one support member 44 out from the mounting bracket 43 in a substantially straight line (in direction 999—FIG. 9) movement and replacing the removed support member with another different support member 44 by sliding the different support member 444 into the mounting bracket 43 (i.e., so as to occupy the space of in the mounting bracket of the just removed support member) in a substantially straight line movement (in direction 999—FIG. 9). The slot joint 921 defines a guideway interface between the mounting bracket 43 and the support member 44 so that the mounting bracket 43 and the support member 44 slide relative to each other in sliding direction 999 effecting coupling and decoupling of the support member 44 and the mounting bracket 43 to each other. The guideway interface has an orientation in a direction athwart the released direction 297 with the support assembly coupling 295 fixing the support surface 44S in the predetermined reference orientation, and the support assembly coupling 295 has the pivot axis 296 to reorient the guideway interface down at least in part from the cantilevered weight of the support member 44.

The guideway interface has a reference datum disposed so as to define the predetermined reference orientation of the support surface 44S substantially coincident with joining of the support member 44 and the mounting bracket 43. As can be seen in FIG. 9, the guideway interface of the slot joint 921 includes a channel 925 that is sized and shaped to receive a base (or proximal) end 1050 of the support member 44. The channel 925 may have any suitable configuration, such as for example, a T-shape, a V-shape, or other suitable shape configured to receive and locate the support member 44 in the predetermined reference orientation. In this aspect, the base end 1050 of the support member 44 is shown as having (for illustrative purposes only) lateral grooves 1051 that are spaced from a locating surface 1055 of the support member 44, where the lateral grooves 1051 receive opposing protrusions 930, 931 of the channel 925. The reference datum is formed by the interface between the locating surface 1055 and upper surface 932 of the channel 925 and/or the interface between one or more of the upper and lower surfaces 1052, 1053 of the lateral grooves 1051 of the support member 44 and the respective upper and lower surfaces 937, 938 of the opposing protrusions 930, 931 of the channel 925. In one aspect, to provide for sliding insertion and removal of the support member 44 to and from the mounting bracket 43, the guideway interface defines a running clearance between the support member 44 and the mounting bracket 43 so the support member 44 and the mounting bracket 43 slide substantially free relative to each other in coupling and decoupling.

Referring to FIGS. 9, 10, and 10A, in one aspect, the support member is fully seated or coupled to the mounting bracket 43 where, for example, a stop surface 1054 of one or more of the lateral grooves 1051 contact a stop surface 933 of the opposing protrusions 930, 931; while in other aspect, any suitable surfaces may locate the support member 44 within the channel 925 in the sliding direction 999. In one aspect, the support member 44 is configured with a visual indicator that provides a visual indication that the support member 44 is fully seated within the channel 925. For example, the base end 1050 of the support member 44 includes a laterally/transverse extending notch 1066 that includes an apex 1067. The support member 44 and the locating surfaces (e.g., in the sliding direction 999) described above may be arranged relative to each other such that upon fully seating or coupling of the support member 44 within the channel 925 of the mounting bracket 43, the apex 1067 is substantially aligned with a back or seat indicating surface 1080 (see FIG. 10A) of the mounting bracket 43. In other aspects, any suitable visual, aural, or other indication may be provided to indicate to an operator that the support member 44 is fully seating in mounting bracket 43.

The slot joint interface 921 described above provides for tool-less (i.e., no tools needed) replacement of the support member 44. The tool-less changing of the support member 44 occurs, as noted above, by sliding the "old" support member out of the channel 925 and sliding a "replacement"

support member 44 into the channel 925 from which the "old" support member 44 was removed. Replacement of the support member 44 may occur in about two minutes or less compared to a fork replacement time of about 15 minutes or more for a conventional end of arm palletizing tool. Removal of the "old" support member 44 may be further facilitated by tipping the tool 10A, 10B (such as through suitable control of the robot arm 14) so that a cantilevered (or distal) end 1060 of the support member 44 is pointed downwards (e.g., towards the floor) so that removal of the support member 44 may be a gravity assisted removal.

Figure 9B:
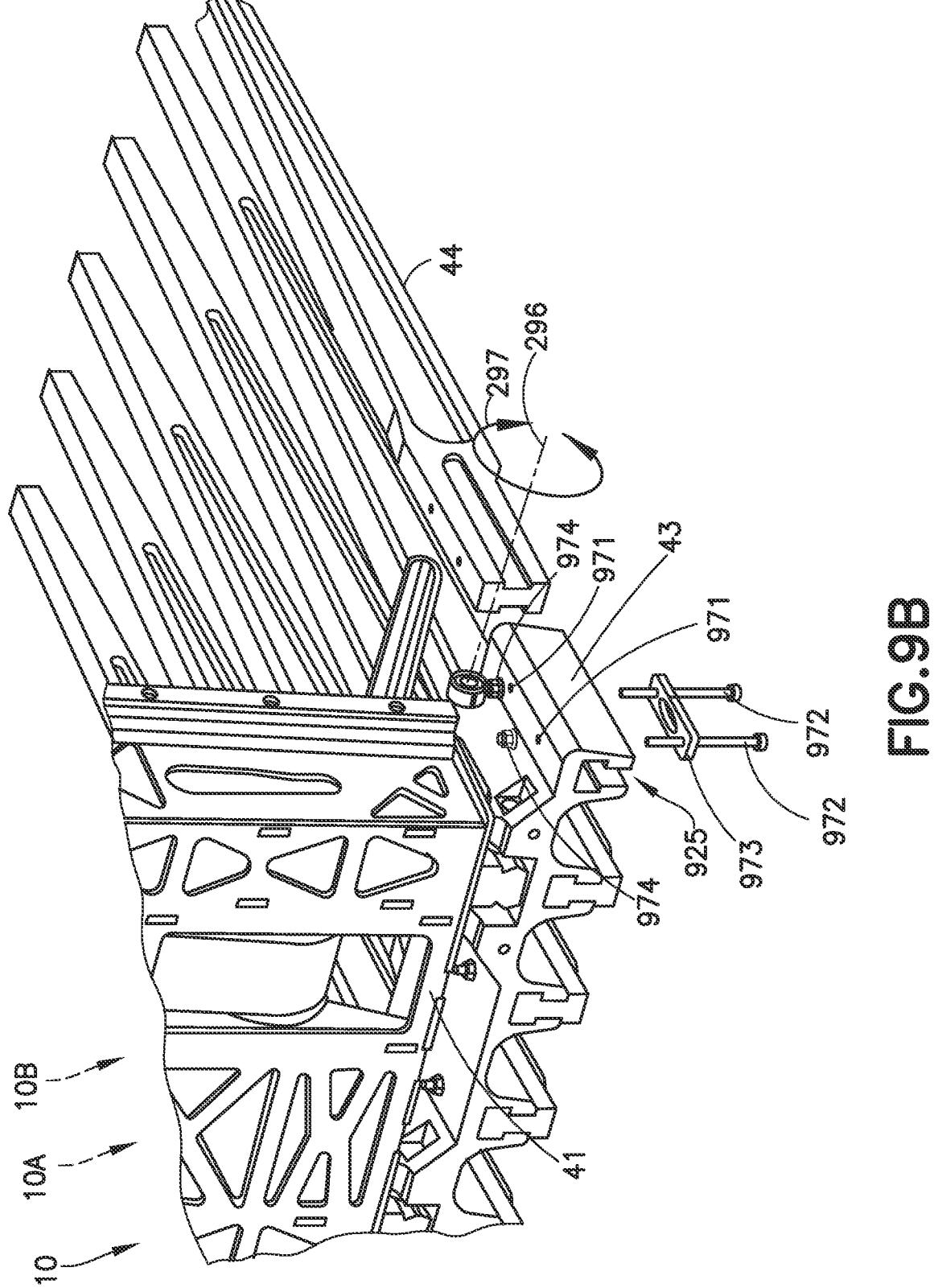
FIG. 9B is a partial perspective illustration of a fork coupling of the tools of FIGS. 2 and 5 in accordance with aspects of the present disclosure.
Figure 10C:
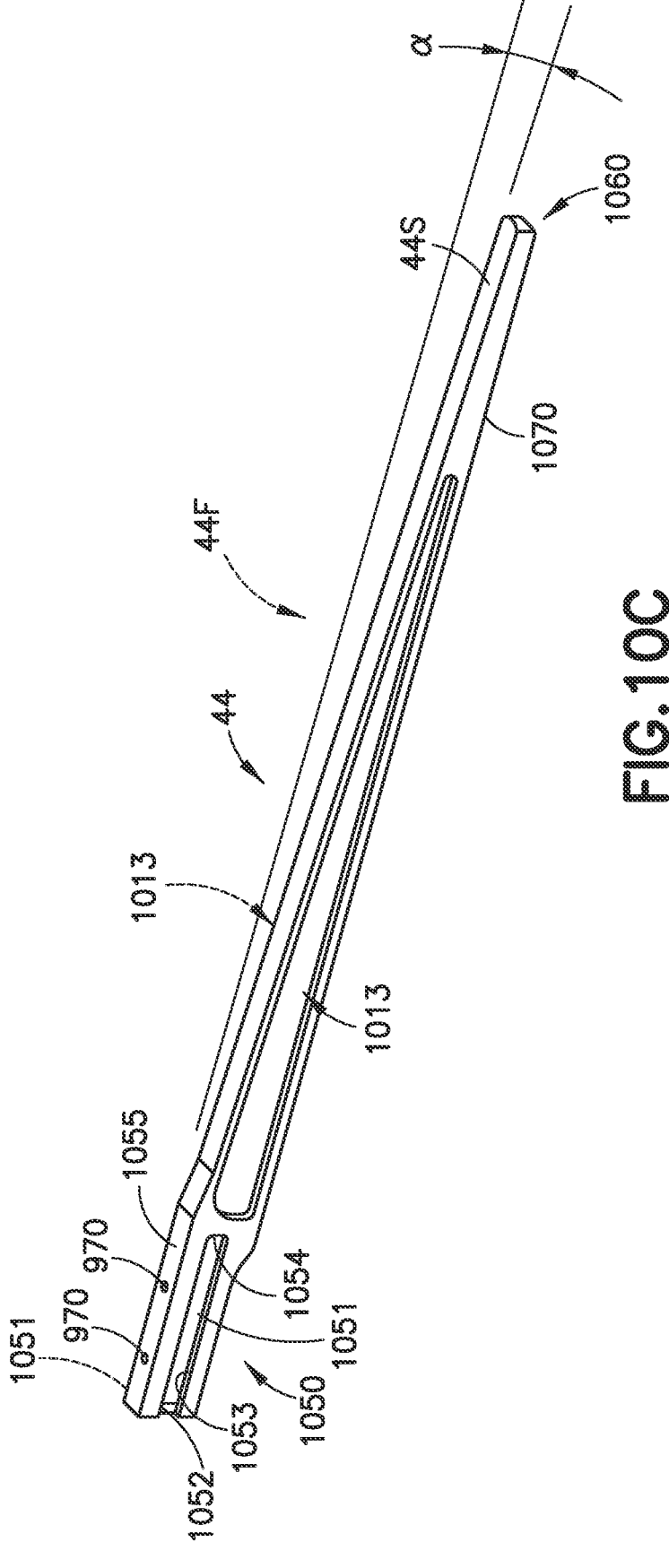
FIG. 10C is a perspective illustration of a fork of the tools of FIGS. 2 and 5 in accordance with aspects of the present disclosure.

Referring also to FIGS. 9B and 10C, in one or more aspects, the support member 44 is coupled to the mounting bracket by any suitable removable fastener 972 (such as a bolt, screw, clip, etc.). For example, the proximal end 1050 of the support member 44 includes one or more apertures 970 that are shaped and sized for the passage of a respective fastener 972 therethrough (i.e., the apertures 970 are clearance holes that do not engage the fastener 972 other than to allow passage of the fastener 972 through the support member 44). The channels 925 of the mounting bracket 43 includes respective apertures 971 that are positioned in the mounting bracket 43 so as to be substantially aligned with a respective aperture 970 of the support member 44 with the support member 44 fully seated within the channel 925. It is noted that while the support member 44 is not illustrated as having the notch 1066, in one or more aspects, the notch 1066 is included in the support member with the apertures 970. In some aspects, the apertures 971 of the mounting bracket are clearance holes and the fasteners 972 passing through both the apertures 970 and 971 are retained by any suitable retainer 974 (e.g., nut, clip, pin, etc.) so that the fastener 971 at least in part couples the support member 44 to the mounting bracket 43. In other aspects the apertures 971 are threaded apertures so that the fasteners 972 are threadably engaged with the apertures 971 so as to at least in part couple the support member 44 to the mounting bracket 43. In still other aspects some apertures 971 are threaded while other apertures are clearance holes. For example, referring also to FIG. 9A, channels 925T disposed opposite the protrusions 979 include threaded apertures 971 while the other channels 925C include through-hole apertures 971. In some aspects, any suitable reinforcing plate 973 is provided between a head of the fastener(s) 972 and a respective support member 44 so as to increase an interface surface (and any loading applied thereto) between the fastener 972 and the support member 44.

Figure 11:
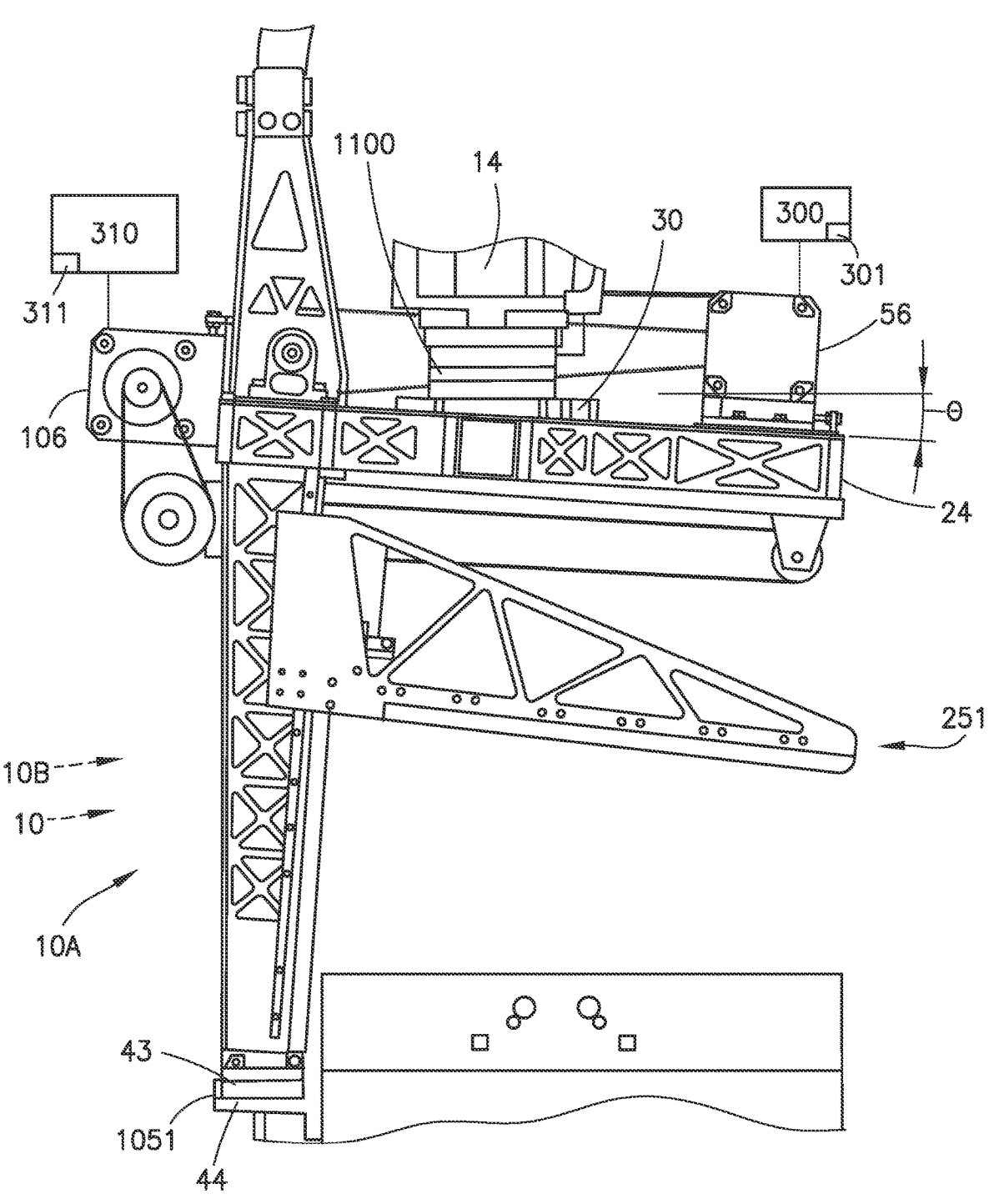
FIG. 11 is a side elevation illustration of a portion of the palletizer cell of FIG. 1 in accordance with aspects of the present disclosure.

Referring to FIGS. 10-12, the support member 44 has a tapered form where the taper decreases from the base end 1050 to the cantilevered end 1060. The support member 44 has a reference surface (e.g., bottom surface 1070) that provides a positioning reference for the tool 10, 10A, 10B moved by the robot arm 14 to a place position in the palletizer 15 from which place position the product 12 is discharged from the tool 10, 10A, 10B and placed on the pallet 20 in the palletizer 15. The reference surface (e.g., bottom surface 1070) is disposed opposite to the support surface 44S. The bottom surface 1070 is positioned substantially aligned with the predetermined level plane PLN with the tool 10, 10A, 10B at the place position. For example, the taper of the support member 44 is such that where the bottom surface 1070 (which may be substantially parallel with one or more of the lateral grooves 1051 and the locating surface 1055) is substantially parallel with a surface 1220 (e.g., of another product 12 or any suitable support surface of the palletizer cell 15) upon which a product 12 is picked or placed, the support surface 44S of the support member 44 is disposed at an angle α relative to the surface 1220. Here the angle α provides for a decreased "drop height" 1200 compared to forks having a product support surface that is substantially parallel with the surface upon which the product is placed to or picked from. In other words, the support surface 44S inclined by the anhedral angle α towards the predetermined level plane PLN at the distal end 1060 enables positioning of the tool 10, 10A, 10B at the place position so that the product 12, discharged from the support surface 44S at the distal end 1060 to effect placement of the product 12 onto the pallet 20, has a minimum drop from the support surface 44S to the pallet 20 or other suitable support surface. In one aspect, the anhedral angle α is about 3° so that the drop height provided by the support member 44 is about three-quarters of an inch (about 19 mm) or less. In other aspects, the angle α may be more or less than 3° so as to provide for any suitable drop height 1200. In one aspect, the angle α of the support surface 44S relative to the surface 1220 may substantially correspond to (or be substantially the same as) the angle θ of the robot-mounting bracket 30 described above; while in other aspects, the angle α may be different (e.g., greater than or less than) than the angle θ.

Still referring to FIG. 10, in one aspect, the support member 44 may also include relieved or recessed sides 1013. The recessed sides may provide the support member with a tapered I-beam shape that provides a greater stiffness in direction 298 than in direction 1098. Here the recessed sides 1013 decrease a cross section of the support member to increase the elasticity (e.g., allow elastic flexure) of the support member 44 in direction 1098 so that upon contact of the support member 44 with an object 1300 (FIG. 13) in direction 1098 the support member 44 may flex elastically and resile to its original shape when contact with the object 1300 is released. Here compliance of the support member 44 in direction 1098 is provided by the resilience of the support member 44 and compliance of the support member 44 in direction 298 is provided by compliant coupling 950 described herein.

Referring to FIGS. 1, 2, 5, and 14, a method for palletizing mixed load products in accordance with aspects of the present disclosure will be described. The method includes providing a tool 10A, 10B (FIG. 14, Block 1400) having a frame 24, 24A for mounting the tool 10A, 10B to a robot arm 14. In the manner described above, the tool 10A, 10B has the support assembly 250 movably coupled to the frame 24, 24A, and a gripping assembly 26, 26A mounted to the frame 24, 24A with an actuator (e.g., see the first drive 56 and the second drive assembly 168) and a grip press 251, 251A operably coupled to the actuator. A product is supported (FIG. 14, Block 1410) on the support member 44 of the support assembly 250. As described herein the support member 44 forms a support surface 44S disposed in the predetermined reference orientation so as to support thereon the product 12 seated on the support surface 44S. The grip press 251, 251A is moved relative to the frame 24, 24A in the actuation direction 298 opposite the support surface 44S so as to clamp the product 12 (FIG. 14, Block 1420) between the support surface 44S in the predetermined reference orientation and the grip press 251, 251A. As described above, the support assembly coupling 295 to the frame 24, 24A has a configuration fixing the support member 44 relative to the frame 24, 24A in the actuation direction 298 with the support surface 44S in the predetermined reference orientation and that is movably released in at least another direction 297 so that the support member 44 is movable relative to the frame 24, 24A so that the support surface 44S moves substantially freely away from the predetermined reference orientation.

As described herein, the another direction 297 is a released direction, wherein the support surface 44S moves substantially freely in the released direction by contact of the object 1300 (FIG. 13) against the support member 44 in a contact direction 1310 aligned at least in part with the released direction 297, which contact of the object against the support member is generated by relative motion between the support member 44 and the object 1300. Exemplary motions/paths 197-199 of the support member 44 (and the tool 10A, 10B) are illustrated in FIG. 1 as palletizing motions of the robot arm 14 moving the tool 10A, 10B. For example, the robot arm 14 may move the tool 10 (which is representative of tools 10A, 10B) in palletizing motion/path 197 towards the product pick station 16P. The palletizing motion may include one or more horizontal and vertical moves of the tool 10 so as to place the support members 44 underneath the product 12 to be picked and gripped by the tool 10. The robot arm 14 may move the tool 10 in palletizing motion/path 198 with the product 12 so as to lift the product 12 from the product pick station 16P to a location above/adjacent the pallet 20. The robot arm 14 moves the tool in palletizing motion/path 199 to place the product 12 on the pallet 20 (e.g., on the pallet 20 or on one or more products 12 already disposed on the pallet 20). Where the support members 44 contact the object 1300 during the palletizing motions/paths 197-199, the support member 44 may move in the released direction 297 about pivot axis 296, laterally flex in direction 1098 (see FIG. 10), and flex in direction 298 in a resilient manner as described above. In aspects where the support member 44 is the frangible support member 44F, the support member 44 contact with the object 1300 during the palletizing motions/ paths 197-199 causes the support member to move in the released direction 297 about pivot axis 296 and/or fracture (see FIG. 10B) in manner as described above. In some aspects the tool 10, 10A, 10B may have a compliance support, as described, with support members 44 of a conventional type (accepting permanent deformation/bending on strike). In some other aspects, the frangible support members described herein may be mounted to a conventional end of arm palletizing tool.

Here, where contact is made between the support member 44 and the object 1300 the support surface 44S of the support member 44 may move away from the predetermined reference orientation where, as described herein, the support assembly coupling 295 has a movably released configuration that allows the support member to move substantially freely relative to the frame 24, 24A in the released direction 297 with the gripping assembly 26, 26A in a condition other than clamped.

Where contact is made between the support member 44 and the object, the gripping assembly 26, 26A has a position compliance device 300, 500 disposed so that the grip press 251, 251A actuation to clamp the product between the support surface 44S and the grip press 251, 251A is compliant to a displaced position of the support surface 44S, in direction 297, away from the predetermined reference orientation. For example, where a product 12 is gripped by the tool 10A, 10B and the support surface 44S is moved away from the predetermine reference position in direction 297, an opposing force may be exerted against the gripping force of the grip press 251, 251A. The opposing force may be detected by the position compliance device 300, 500 and the gripping force may be released or reduced to accommodate the movement of the support surface 44S, in direction 297, away from the predetermined reference orientation substantially without affecting the product 12 held by the tool 10A, 10B. Upon release of the contact between the support surface 44 and the object 1300, the support surface 44S may return to the predetermined reference orientation under the weight of the support members and/or product held thereon and the product 12 may be placed at any suitable location (e.g., on the pallet 20 or other location where the product 12 may be inspected prior to palletization). With the tool 10A, 10B free of product, the location of the grip press 251, 251A may be recalibrated or zeroed out by driving the grip press 251, 251A to a known location, such as into contact with the support surface 44S. The contact between the grip press 251, 251A and the support surface 44S is registered by the position compliance device 300, 500, where registration of the contact indicates to the controller 22 of the tool 10A, 10B that the grip press 251, 251A is in a known location and operation of the grip press may continue with calibrated movements. The position compliance device 300, 500 may also reduce torque of the respective drive assembly or stop the drive assembly if resistance to movement of the grip press 251, 251A increases above a predetermined threshold to protect drive assembly components against wear.

In one aspect, the method includes pushing the product (FIG. 14, Block 1430), such as when placing the product 12 on the pallet 20 or other product holding location, in a longitudinal movement along the support member 44 with the pusher assembly 28, 28A. As described above, the pusher bar(s) 94 are driven by drive assembly 88, 162 which includes position compliance device 310, 600. The position compliance device 310, 600 may reduce torque of the respective drive assembly or stop the drive assembly if resistance to movement of the pusher assembly 28, 28A increases above a predetermined threshold to protect drive assembly components against wear. The position compliance device 310, 600 may also effect recalibration or zeroing out of the pusher bar 94 movements by driving the pusher bar(s) 94 to a known location, such as fully retracted towards the posts 41, 41' (or beams 148, 150) where further movement of the pusher bar(s) 94 towards the posts 41, 41' (or beams 148, 150) is arrested or limited by allowed travel of the tracks 96, 158. The arrested movement of the pusher bar(s) 94 is registered by the position compliance device 310, 600, where registration of the arrested movement indicates to the controller 22 of the tool 10A, 10B that the pusher bar(s) 94 is/are in a known location and operation of the pusher bar(s) may continue with calibrated movements.

Figure 14:
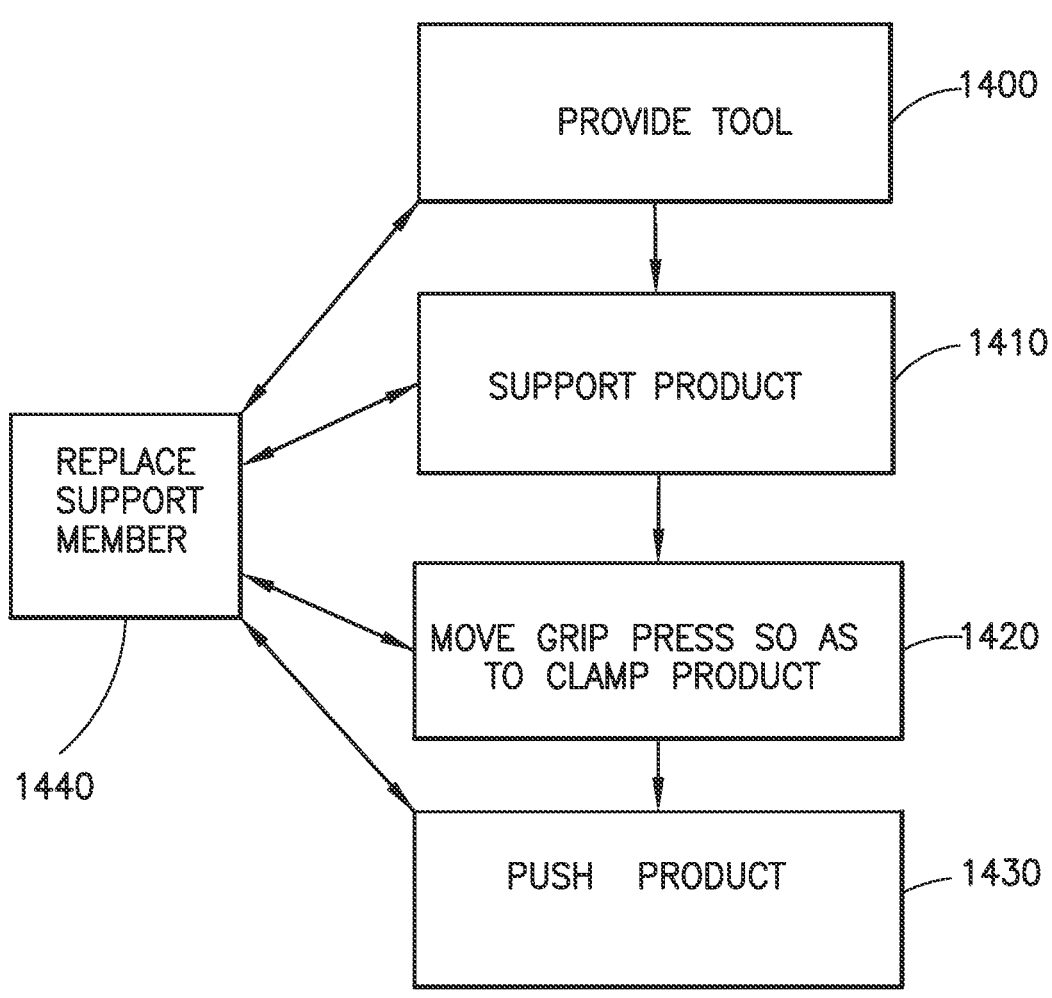
FIG. 14 is a flow diagram of a method incorporating aspects of the present disclosure.

In one aspect, the method includes replacement of one or more support members 44 (FIG. 14, Block 1440). As described above, the support member 44 may be one or more of joined and dis-joined to/from the mounting bracket 43 such as where the support member is worn, broken, or otherwise is to be replaced.

Figure 15:
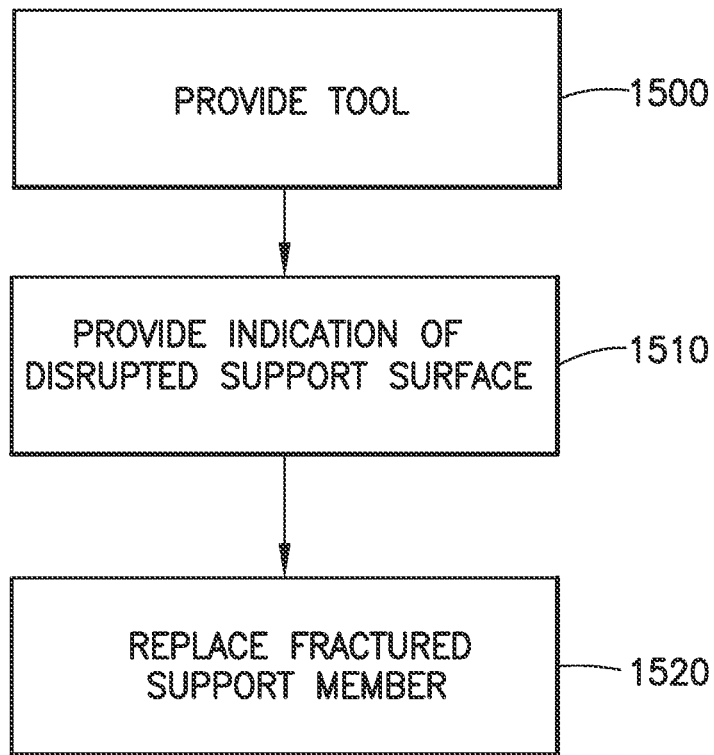
FIG. 15 is a flow diagram of a method incorporating aspects of the present disclosure.

Referring to FIGS. 1, 2, 5, and 15, in one aspect of the present disclosure a method for palletizing mixed load products will be described. In the method the tool 10, 10A, 10B is provided (FIG. 15, Block 1500) on the robot 14 in a manner substantially similar to that described above. A predetermined indication (such as described above) of fracture of the frangible support member 44 and a disruption of the support surface 44S is provided, with/by the frangible support member 44, to an operator on impact of the frangible support member 44 with an obstruction (such as object 1300—FIGS. 13, 13A (FIG. 15, Block 1510). The fractured support member 44 is replaced with another frangible support member with a fast swapping of the fractured support member 44 with the another frangible support member 44 (FIG. 15, Block 1520). As described herein, the fast swapping of the fractured support member 44 with the another frangible support member 44 is a substantially tool-less removal of the fractured support member 44 from the support assembly 43 and a substantially tool-less insertion of the another support member 44 into the support assembly 43. Here, the frangible support member 44 is coupled to the frame 24, 24A with a coupling 295 that is compliant at least in part, and the frangible support member 44 fractures on impact with the object 1300 exceeding compliance of the coupling 295.

In accordance with one or more aspects of the present disclosure a tool for palletizing mixed load products is provided. The tool comprises:

a frame for mounting the tool to a robot;

a support assembly movably coupled to the frame, the support assembly having a support member forming a support surface disposed in a predetermined reference orientation so as to support thereon a product seated on the support surface; and a gripping assembly mounted to the frame with an actuator and a grip press operably coupled to the actuator so as to move the grip press relative to the frame in an actuation direction opposite the support surface so as to clamp the product between the support surface in the predetermined reference orientation and the grip press;

wherein the support assembly coupling to the frame has a configuration fixing the support member relative to the frame in the actuation direction with the support surface in the predetermined reference orientation and that is movably released in at least another direction so that the support member is movable relative to the frame so that the support surface moves substantially freely away from the predetermined reference orientation.

In accordance with one or more aspects of the present disclosure at least the another direction is a released direction, wherein the support surface moves substantially freely in the released direction by contact of an object against the support member in a contact direction aligned at least in part with the released direction, which contact of the object against the support member is generated by relative motion between the support member and the object.

In accordance with one or more aspects of the present disclosure contact between the support member and the object that effects movement of the support surface substantially freely is generated through palletizing motion of the robot moving the tool.

In accordance with one or more aspects of the present disclosure the object is the product or a different product disposed at least at one of a product pick station, that holds the product for picking by the tool, and a portion of a palletizer cell.

In accordance with one or more aspects of the present disclosure the object is a structure from at least one of a structure of a product pick station, that holds the product for picking by the tool, a structure of a palletizer cell, and a structure seated on at least part of the palletizer cell.

In accordance with one or more aspects of the present disclosure the another direction is oriented substantially against the actuation direction.

In accordance with one or more aspects of the present disclosure the support surface is planar and defines a predetermined reference plane in the predetermined reference orientation.

In accordance with one or more aspects of the present disclosure the support assembly coupling has a movably released configuration so that the support member is movable substantially freely relative to the frame in at least the another direction with the gripping assembly in a condition other than clamped wherein the product is gripped by the support surface and the grip press.

In accordance with one or more aspects of the present disclosure the gripping assembly has a position compliance device disposed so that the grip press actuation to clamp the product between the support surface and the grip press is compliant to a displaced position of the support surface away from the predetermined reference orientation.

In accordance with one or more aspects of the present disclosure the position compliance device is a torque limiting device.

In accordance with one or more aspects of the present disclosure the tool further comprises:

a pusher assembly including a pusher that is mounted to the frame for longitudinal movement along the support member; and a pusher actuator that has position compliance.

In accordance with one or more aspects of the present disclosure the support assembly coupling has a pivot disposed between the support member and the frame that defines the motion release of the support assembly coupling so that the support member is movable relative to the frame in the another direction.

In accordance with one or more aspects of the present disclosure the support assembly has a support base dependent from the frame and the support member is dependent and projects from the support base and is connected to the frame by the support base.

In accordance with one or more aspects of the present disclosure the support member is removably joined to the support base with a sliding joint configured so that the support member and support base slide relative to each other and the support member is joined and dis-joined to the support base by relative sliding between the support member and the support base.

In accordance with one or more aspects of the present disclosure the support member is removably joined to the support base by a slot joint that defines a guideway interface between the support base and the support member so that the support base and the support member slide relative to each other effecting coupling and decoupling of the support member and the support base to each other.

In accordance with one or more aspects of the present disclosure the guideway interface has a reference datum disposed so as to define the predetermined reference orientation of the support surface substantially coincident with joining of the support member and the support base.

In accordance with one or more aspects of the present disclosure the guideway interface defines a running clearance between the support member and the support base so the support member and the support base slide substantially free relative to each other in coupling and decoupling.

In accordance with one or more aspects of the present disclosure the guideway interface has an orientation in a direction athwart the released direction with the support assembly coupling fixing the support surface in the predetermined reference orientation, and the support assembly coupling has a pivot to reorient the guideway interface down at least in part.

In accordance with one or more aspects of the present disclosure, the tool further comprises a wedge coupled to the frame, the wedge is configured to couple the frame to a robot arm of the robot so that the tool has a predetermined angle, set by the wedge, relative to a mounting surface of an end of arm tool mount of the robot arm.

In accordance with one or more aspects of the present disclosure the support member has a tapered product support surface, where an angle of the tapered product support surface substantially corresponds to the predetermined angle set by the wedge.

In accordance with one or more aspects of the present disclosure, the angle of the tapered product support surface and the predetermined angle set by the wedge are substantially the same.

In accordance with one or more aspects of the present disclosure a tool for palletizing mixed load products is provided. The tool comprises:

a frame for mounting the tool to a robot;

a support assembly movably coupled to the frame, the support assembly having a support member forming a support surface disposed in a predetermined reference orientation so as to support thereon a product seated on the support surface; and a gripping assembly mounted to the frame with an actuator and a grip press operably coupled to the actuator so as to move the grip press relative to the frame in an actuation direction opposite the support surface so as to grip the product between the support surface in the predetermined reference orientation and the grip press;

wherein the support assembly coupling to the frame is positionally deterministic so that the support assembly coupling deterministically positions the support member in the actuation direction in a predetermined position with the support surface at the predetermined reference orientation relative to the frame, and that is movably released in a released direction different than the actuation direction so that the support member is substantially freely movable relative to the frame in the released direction away from the predetermined position.

In accordance with one or more aspects of the present disclosure the support surface moves substantially freely in the released direction by contact of an object against the support member in a contact direction aligned at least in part with the released direction, which contact of the object against the support member is generated by relative motion between the support member and the object.

In accordance with one or more aspects of the present disclosure contact between the support member and the object that effects movement of the support surface substantially freely is generated through palletizing motion of the robot moving the tool.

In accordance with one or more aspects of the present disclosure the object is the product or a different product disposed at least at one of a product pick station, that holds the product for picking by the tool, and a portion of a palletizer cell.

In accordance with one or more aspects of the present disclosure the object is a structure from at least one of a structure of a product pick station, that holds the product for picking by the tool, a structure of a palletizer cell, and a structure seated on at least part of the palletizer cell.

In accordance with one or more aspects of the present disclosure the released direction is oriented substantially against the actuation direction.

In accordance with one or more aspects of the present disclosure the support surface is planar and defines a predetermined reference plane in the predetermined reference orientation.

In accordance with one or more aspects of the present disclosure the support assembly coupling has a movably released configuration so that the support member is movable substantially freely relative to the frame in at least the released direction with the gripping assembly in a condition other than clamped wherein the product is gripped by the support surface and the grip press.

In accordance with one or more aspects of the present disclosure the gripping assembly has a position compliance device disposed so that the grip press actuation to clamp the product between the support surface and the grip press is compliant to a displaced position of the support surface away from the predetermined reference orientation.

In accordance with one or more aspects of the present disclosure the position compliance device is a torque limiting device.

In accordance with one or more aspects of the present disclosure the tool further comprises:

a pusher assembly including a pusher that is mounted to the frame for longitudinal movement along the support member; and a pusher actuator that has position compliance.

In accordance with one or more aspects of the present disclosure the support assembly coupling has a pivot disposed between the support member and the frame that defines the motion release of the support assembly coupling so that the support member is movable relative to the frame in the released direction.

In accordance with one or more aspects of the present disclosure the support assembly has a support base dependent from the frame and the support member is dependent and projects from the support base and is connected to the frame by the support base.

In accordance with one or more aspects of the present disclosure the support member is removably joined to support base with a sliding joint configured so that the support member and support base slide relative to each other and the support member is joined and dis-joined to the support base by relative sliding between the support member and the support base.

In accordance with one or more aspects of the present disclosure the support member is removably joined to the support base by a slot joint that defines a guideway interface between the support base and the support member so that the support base and the support member slide relative to each other effecting coupling and decoupling of the support member and the support base to each other.

In accordance with one or more aspects of the present disclosure the guideway interface has a reference datum disposed so as to define the predetermined reference orientation of the support surface substantially coincident with joining of the support member and the support base.

In accordance with one or more aspects of the present disclosure the guideway interface defines a running clearance between the support member and the support base so the support member and the support base slide substantially free relative to each other in coupling and decoupling.

In accordance with one or more aspects of the present disclosure the guideway interface has an orientation in a direction athwart the released direction with the support assembly coupling fixing the support surface in the predetermined reference orientation, and the support assembly coupling has a pivot to reorient the guideway interface down at least in part.

In accordance with one or more aspects of the present disclosure, the tool further comprises a wedge coupled to the frame, the wedge is configured to couple the frame to a robot arm of the robot so that the tool has a predetermined angle, set by the wedge, relative to a mounting surface of an end of arm tool mount of the robot arm.

In accordance with one or more aspects of the present disclosure the support member has a tapered product support surface, where an angle of the tapered product support surface substantially corresponds to the predetermined angle set by the wedge.

In accordance with one or more aspects of the present disclosure, the angle of the tapered product support surface and the predetermined angle set by the wedge are substantially the same.

In accordance with one or more aspects of the present disclosure a tool for palletizing mixed load products is provided. The tool comprises:

a frame for mounting the tool to a robot;

a support assembly having a support member movably coupled to the frame via a compliant coupling, and forming a support surface disposed in a predetermined reference orientation so as to support thereon a product seated on the support surface; and a gripping assembly mounted to the frame with an actuator and a grip press operably coupled to the actuator so as to move the grip press relative to the frame in an actuation direction opposite the support surface so as to grip the product between the support surface in the predetermined reference orientation and the grip press;

wherein the compliant coupling is compliant in a compliance direction so that the support member is compliant and movable relative to the frame in the compliance direction, and wherein the compliant coupling is positionally deterministic so as to deterministically position the support member in the actuation direction in a predetermined position with the support surface at the predetermined reference orientation relative to the frame.

In accordance with one or more aspects of the present disclosure the compliance direction is different than the actuation direction, and the compliant coupling is configured so that compliance of the support member moves the support surface relative to the frame in the compliance direction away from the predetermined position.

In accordance with one or more aspects of the present disclosure the compliant coupling is configured so that the support member is compliant independent of whether the tool is in a gripping condition, wherein the product is gripped by the support surface and the grip press, and an ungripping condition.

In accordance with one or more aspects of the present disclosure the gripping assembly has a position conformance device disposed so that the grip press actuation so as to grip the product between the support surface and the grip press is conformal to a displaced position of the support surface away from the predetermined reference orientation.

In accordance with one or more aspects of the present disclosure the position conformance device is a torque limiting device.

In accordance with one or more aspects of the present disclosure at least the compliance direction is a released direction, wherein the support surface moves substantially freely in the released direction by contact of an object against the support member in a contact direction aligned at least in part with the released direction, which contact of the object against the support member is generated by relative motion between the support member and the object.

In accordance with one or more aspects of the present disclosure contact between the support member and the object that effects movement of the support surface substantially freely is generated through palletizing motion of the robot moving the tool.

In accordance with one or more aspects of the present disclosure the object is the product or a different product disposed at least at one of a product pick station, that holds the product for picking by the tool, and a portion of a palletizer cell.

In accordance with one or more aspects of the present disclosure the object is a structure from at least one of a structure of a product pick station, that holds the product for picking by the tool, a structure of a palletizer cell, and a structure seated on at least part of the palletizer cell.

In accordance with one or more aspects of the present disclosure the compliance direction is oriented substantially against the actuation direction.

In accordance with one or more aspects of the present disclosure the support surface is planar and defines a predetermined reference plane in the predetermined reference orientation.

In accordance with one or more aspects of the present disclosure the compliant coupling has a movably released configuration so that the support member is movable substantially freely relative to the frame in at least the compliance direction with the gripping assembly in a condition other than clamped wherein the product is gripped by the support surface and the grip press.

In accordance with one or more aspects of the present disclosure the tool further comprises:

a pusher assembly including a pusher that is mounted to the frame for longitudinal movement along the support member; and a pusher actuator that has position compliance.

In accordance with one or more aspects of the present disclosure the compliant coupling has a pivot disposed between the support member and the frame that defines the motion release of the compliant coupling so that the support member is movable relative to the frame in the compliance direction.

In accordance with one or more aspects of the present disclosure the support assembly has a support base dependent from the frame and the support member is dependent and projects from the support base and is connected to the frame by the support base.

In accordance with one or more aspects of the present disclosure the support member is removably joined to support base with a sliding joint configured so that the support member and support base slide relative to each other and the support member is joined and dis-joined to the support base by relative sliding between the support member and the support base.

In accordance with one or more aspects of the present disclosure the support member is removably joined to the support base by a slot joint that defines a guideway interface between the support base and the support member so that the support base and the support member slide relative to each other effecting coupling and decoupling of the support member and the support base to each other.

In accordance with one or more aspects of the present disclosure the guideway interface has a reference datum disposed so as to define the predetermined reference orientation of the support surface substantially coincident with joining of the support member and the support base.

In accordance with one or more aspects of the present disclosure the guideway interface defines a running clearance between the support member and the support base so the support member and the support base slide substantially free relative to each other in coupling and decoupling.

In accordance with one or more aspects of the present disclosure the guideway interface has an orientation in a direction athwart the compliance direction with the compliant coupling fixing the support surface in the predetermined reference orientation, and the compliant coupling has a pivot to reorient the guideway interface down at least in part.

In accordance with one or more aspects of the present disclosure, the tool further comprises a wedge coupled to the frame, the wedge is configured to couple the frame to a robot arm of the robot so that the tool has a predetermined angle, set by the wedge, relative to a mounting surface of an end of arm tool mount of the robot arm.

In accordance with one or more aspects of the present disclosure the support member has a tapered product support surface, where an angle of the tapered product support surface substantially corresponds to the predetermined angle set by the wedge.

In accordance with one or more aspects of the present disclosure, the angle of the tapered product support surface and the predetermined angle set by the wedge are substantially the same.

In accordance with one or more aspects of the present disclosure a palletizing robot for palletizing mixed load products is provided. The palletizing robot comprises:

a base;

1a robot arm movably coupled to the base, the robot arm having a tool coupling; and a palletizing tool including:

a frame for mounting the palletizing tool to the tool coupling of the robot arm;

a support assembly movably coupled to the frame, the support assembly having a support member forming a support surface disposed in a predetermined reference orientation so as to support thereon a product seated on the support surface; and a gripping assembly mounted to the frame with an actuator and a grip press operably coupled to the actuator so as to move the grip press relative to the frame in an actuation direction opposite the support surface so as to clamp the product between the support surface in the predetermined reference orientation and the grip press;

wherein the support assembly coupling to the frame has a configuration fixing the support member relative to the frame in the actuation direction with the support surface in the predetermined reference orientation and that is movably released in at least another direction so that the support member is movable relative to the frame so that the support surface moves substantially freely away from the predetermined reference orientation.

In accordance with one or more aspects of the present disclosure at least the another direction is a released direction, wherein the support surface moves substantially freely in the released direction by contact of an object against the support member in a contact direction aligned at least in part with the released direction, which contact of the object against the support member is generated by relative motion between the support member and the object.

In accordance with one or more aspects of the present disclosure contact between the support member and the object that effects movement of the support surface substantially freely is generated through palletizing motion of the robot arm moving the tool.

In accordance with one or more aspects of the present disclosure the object is the product or a different product disposed at least at one of a product pick station, that holds the product for picking by the tool, and a portion of a palletizer cell.

In accordance with one or more aspects of the present disclosure the object is a structure from at least one of a structure of a product pick station, that holds the product for picking by the tool, a structure of a palletizer cell, and a structure seated on at least part of the palletizer cell.

In accordance with one or more aspects of the present disclosure the another direction is oriented substantially against the actuation direction.

In accordance with one or more aspects of the present disclosure the support surface is planar and defines a predetermined reference plane in the predetermined reference orientation.

In accordance with one or more aspects of the present disclosure the support assembly coupling has a movably released configuration so that the support member is movable substantially freely relative to the frame in at least the another direction with the gripping assembly in a condition other than clamped wherein the product is gripped by the support surface and the grip press.

In accordance with one or more aspects of the present disclosure the gripping assembly has a position compliance device disposed so that the grip press actuation to clamp the product between the support surface and the grip press is compliant to a displaced position of the support surface away from the predetermined reference orientation.

In accordance with one or more aspects of the present disclosure the position compliance device is a torque limiting device.

In accordance with one or more aspects of the present disclosure the palletizing tool further comprises:

a pusher assembly including a pusher that is mounted to the frame for longitudinal movement along the support member; and a pusher actuator that has position compliance.

In accordance with one or more aspects of the present disclosure the support assembly coupling has a pivot disposed between the support member and the frame that defines the motion release of the support assembly coupling so that the support member is movable relative to the frame in the another direction.

In accordance with one or more aspects of the present disclosure the support assembly has a support base dependent from the frame and the support member is dependent and projects from the support base and is connected to the frame by the support base.

In accordance with one or more aspects of the present disclosure the support member is removably joined to support base with a sliding joint configured so that the support member and support base slide relative to each other and the support member is joined and dis-joined to the support base by relative sliding between the support member and the support base.

In accordance with one or more aspects of the present disclosure the support member is removably joined to the support base by a slot joint that defines a guideway interface between the support base and the support member so that the support base and the support member slide relative to each other effecting coupling and decoupling of the support member and the support base to each other.

In accordance with one or more aspects of the present disclosure the guideway interface has a reference datum disposed so as to define the predetermined reference orientation of the support surface substantially coincident with joining of the support member and the support base.

In accordance with one or more aspects of the present disclosure the guideway interface defines a running clearance between the support member and the support base so the support member and the support base slide substantially free relative to each other in coupling and decoupling.

In accordance with one or more aspects of the present disclosure the guideway interface has an orientation in a direction athwart the released direction with the support assembly coupling fixing the support surface in the predetermined reference orientation, and the support assembly coupling has a pivot to reorient the guideway interface down at least in part.

In accordance with one or more aspects of the present disclosure method for palletizing mixed load products is provided. The method comprises:

provided a tool having a frame for mounting the tool to a robot, a support assembly movably coupled to the frame, and a gripping assembly mounted to the frame with an actuator and a grip press operably coupled to the actuator;

supporting a product on a support member of the support assembly, the support member forming a support surface disposed in a predetermined reference orientation so as to support thereon the product seated on the support surface; and moving the grip press relative to the frame in an actuation direction opposite the support surface so as to clamp the product between the support surface in the predetermined reference orientation and the grip press;

wherein the support assembly coupling to the frame has a configuration fixing the support member relative to the frame in the actuation direction with the support surface in the predetermined reference orientation and that is movably released in at least another direction so that the support member is movable relative to the frame so that the support surface moves substantially freely away from the predetermined reference orientation.

In accordance with one or more aspects of the present disclosure at least the another direction is a released direction, wherein the support surface moves substantially freely in the released direction by contact of an object against the support member in a contact direction aligned at least in part with the released direction, which contact of the object against the support member is generated by relative motion between the support member and the object.

In accordance with one or more aspects of the present disclosure contact between the support member and the object that effects movement of the support surface substantially freely is generated through palletizing motion of the robot moving the tool.

In accordance with one or more aspects of the present disclosure the object is the product or a different product disposed at least at one of a product pick station, that holds the product for picking by the tool, and a portion of a palletizer cell.

In accordance with one or more aspects of the present disclosure the object is a structure from at least one of a structure of a product pick station, that holds the product for picking by the tool, a structure of a palletizer cell, and a structure seated on at least part of the palletizer cell.

In accordance with one or more aspects of the present disclosure the another direction is oriented substantially against the actuation direction.

In accordance with one or more aspects of the present disclosure the support surface is planar and defines a predetermined reference plane in the predetermined reference orientation.

In accordance with one or more aspects of the present disclosure the support assembly coupling has a movably released configuration so that the support member is movable substantially freely relative to the frame in at least the another direction with the gripping assembly in a condition other than clamped wherein the product is gripped by the support surface and the grip press.

In accordance with one or more aspects of the present disclosure the gripping assembly has a position compliance device disposed so that the grip press actuation to clamp the product between the support surface and the grip press is compliant to a displaced position of the support surface away from the predetermined reference orientation.

In accordance with one or more aspects of the present disclosure the position compliance device is a torque limiting device.

In accordance with one or more aspects of the present disclosure the method further comprises pushing the product in a longitudinal movement along the support member with a pusher assembly including a pusher that is mounted to the frame for longitudinal movement along the support member, the pusher being driven by a pusher actuator that has position compliance.

In accordance with one or more aspects of the present disclosure the support assembly coupling has a pivot disposed between the support member and the frame that defines the motion release of the support assembly coupling so that the support member is movable relative to the frame in the another direction.

In accordance with one or more aspects of the present disclosure the support assembly has a support base dependent from the frame and the support member is dependent and projects from the support base and is connected to the frame by the support base.

In accordance with one or more aspects of the present disclosure the method further comprises one or more of joining and dis-joining the support member to the support base, wherein the support member is removably joined to support base with a sliding joint configured so that the support member and support base slide relative to each other and the support member is joined and dis-joined to the support base by relative sliding between the support member and the support base.

In accordance with one or more aspects of the present disclosure the support member is removably joined to the support base by a slot joint that defines a guideway interface between the support base and the support member so that the support base and the support member slide relative to each other effecting coupling and decoupling of the support member and the support base to each other.

In accordance with one or more aspects of the present disclosure the method further comprises defining the predetermined reference orientation of the support surface, with a reference datum of the guideway interface, substantially coincident with joining of the support member and the support base.

In accordance with one or more aspects of the present disclosure the guideway interface defines a running clearance between the support member and the support base so the support member and the support base slide substantially free relative to each other in coupling and decoupling.

In accordance with one or more aspects of the present disclosure the guideway interface has an orientation in a direction athwart the released direction with the support assembly coupling fixing the support surface in the predetermined reference orientation, and the support assembly coupling has a pivot to reorient the guideway interface down at least in part.

In accordance with one or more aspects of the present disclosure a tool for palletizing mixed load products is provided. The tool comprises:

a frame for mounting the tool to a robot in a palletizer configured so as to move the tool along a path in the palletizer; and a support assembly movably coupled to the frame, the support assembly having a frangible support member forming a support surface disposed in a predetermined reference position and orientation so as to support thereon a product seated on the support surface;

wherein the frangible support member has an un-ductile material characterized in that the frangible support member is substantially undeformed and the support surface is substantially invariant, from the predetermined reference position and orientation, from strikes of the support assembly against an obstruction with the tool moved along the path by the robot, and in that the frangible support member remains substantially undeformed, the support surface substantially invariant, onto fracture of the frangible support member on impact with the obstruction that causes the fracture, which fracture disrupts the support surface from the predetermined reference position and orientation, so as to provide the support surface with but two states, a substantially invariant state and a disrupted state.

In accordance with one or more aspects of the present disclosure the frangible support member fracture provides a predetermined indication to an operator of disruption of the support surface.

In accordance with one or more aspects of the present disclosure the predetermined indication has predetermined indicia that identifies to the operator the disruption rendered the support surface unsuitable for seating a product thereon.

In accordance with one or more aspects of the present disclosure the frangible support member is configured so as to define predetermined indicia that provides the predetermined indication, wherein the predetermined indicia is intrinsic to fracture of the frangible support member.

In accordance with one or more aspects of the present disclosure the frangible support member is coupled to the frame with a coupling that is compliant at least in part, and the frangible support member is configured so as to fracture on impact with the obstruction exceeding compliance of the coupling.

In accordance with one or more aspects of the present disclosure the frangible support member is configured so as to be substantially undeformed and the support surface substantially invariant, from the predetermined reference position and orientation, from strikes of the support assembly and the obstruction with the tool moved along the path by the robot commensurate with the predetermined duty cycle of the robot palletizing pallets at the palletizer.

In accordance with one or more aspects of the present disclosure the frangible support member is configured so as to be substantially undeformed and the support surface substantially invariant, from the predetermined reference position and orientation, from impacts of the support assembly and the obstruction with the tool moved along the path by the robot commensurate with optimum trajectory motion of the tool along the path between different product pick and place positions of the tool in the palletizer.

In accordance with one or more aspects of the present disclosure, the tool further comprises a wedge coupled to the frame, the wedge is configured to couple the frame to a robot arm of the robot so that the tool has a predetermined angle, set by the wedge, relative to a mounting surface of an end of arm tool mount of the robot arm.

In accordance with one or more aspects of the present disclosure the support member has a tapered product support surface, where an angle of the tapered product support surface substantially corresponds to the predetermined angle set by the wedge.

In accordance with one or more aspects of the present disclosure, the angle of the tapered product support surface and the predetermined angle set by the wedge are substantially the same.

In accordance with one or more aspects of the present disclosure a tool for palletizing mixed load products is provided. The tool comprises:

a frame for mounting the tool to a robot in a palletizer configured so as to move the tool along a path in the palletizer; and a support assembly movably coupled to the frame, the support assembly having a support member forming a support surface disposed in a predetermined reference position and orientation so as to support thereon a product seated on the support surface;

wherein the support surface has a proximal end and a distal end disposed so that the product is seated between the proximal end and the distal end, and the support member is coupled to the frame at the proximal end, and wherein the support surface is has an anhedral angle, relative to a predetermined level plane, between the proximal and distal end so that the product seated on the support surface is disposed at the anhedral angle at discharge from the tool from the distal end of the support surface.

In accordance with one or more aspects of the present disclosure the support member has a reference surface that provides a positioning reference for the tool moved by the robot to a place position in the palletizer from which place position the product is discharged from the tool and placed on a pallet in the palletizer, the reference surface being disposed opposite to the support surface.

In accordance with one or more aspects of the present disclosure the reference surface is positioned substantially aligned with the predetermined level plane with the tool at the place position.

In accordance with one or more aspects of the present disclosure the support surface inclined by the anhedral angle towards the predetermined level plane at the distal end enables positioning of the tool at the place position so that the product, discharged from the support surface at the distal end to effect placement of the product onto a pallet, has a minimum drop from the support surface to the pallet.

In accordance with one or more aspects of the present disclosure the anhedral angle is about 3°.

In accordance with one or more aspects of the present disclosure, the tool further comprises a wedge coupled to the frame, the wedge is configured to couple the frame to a robot arm of the robot so that the tool has a predetermined angle, set by the wedge, relative to a mounting surface of an end of arm tool mount of the robot arm, and the predetermined angle is substantially the same as the anhedral angle.

In accordance with one or more aspects of the present disclosure, a method for palletizing mixed load products is provided. The method comprises:

providing a tool having:

a frame for mounting the tool to a robot in a palletizer configured so as to move the tool along a path in the palletizer, and a support assembly movably coupled to the frame, the support assembly having a frangible support member forming a support surface disposed in a predetermined reference position and orientation so as to support thereon a product seated on the support surface, where the frangible support member has an un-ductile material characterized in that the frangible support member is substantially undeformed and the support surface is substantially invariant, from the predetermined reference position and orientation, from strikes of the support assembly against an obstruction with the tool moved along the path by the robot, and in that the frangible support member remains substantially undeformed, the support surface substantially invariant, onto fracture of the frangible support member on impact with the obstruction that causes the fracture, which fracture disrupts the support surface from the predetermined reference position and orientation, so as to provide the support surface with but two states, a substantially invariant state and a disrupted state;

providing, with the frangible support member and on impact with the obstruction, a predetermined indication to an operator of fracture of the frangible support member and the disruption of the support surface; and replacing the fractured support member with another frangible support member with a fast swapping of the fractured support member with the another frangible support member.

In accordance with one or more aspects of the present disclosure the fast swapping of the fractured support member with the another frangible support member is a substantially tool-less removal of the fractured support member from the support assembly and a substantially tool-less insertion of the another support member into the support assembly.

In accordance with one or more aspects of the present disclosure the predetermined indication has predetermined indicia that identifies to the operator the disruption rendered the support surface unsuitable for seating a product thereon.

In accordance with one or more aspects of the present disclosure the frangible support member defines predetermined indicia that provides the predetermined indication, wherein the predetermined indicia is intrinsic to fracture of the frangible support member.

In accordance with one or more aspects of the present disclosure the frangible support member is coupled to the frame with a coupling that is compliant at least in part, and the frangible support member fractures on impact with the obstruction exceeding compliance of the coupling.

In accordance with one or more aspects of the present disclosure the frangible support member is configured so as to be substantially undeformed and the support surface substantially invariant, from the predetermined reference position and orientation, from strikes of the support assembly and the obstruction with the tool moved along the path by the robot commensurate with the predetermined duty cycle of the robot palletizing pallets at the palletizer.

In accordance with one or more aspects of the present disclosure the frangible support member is configured so as to be substantially undeformed and the support surface substantially invariant, from the predetermined reference position and orientation, from impacts of the support assembly and the obstruction with the tool moved along the path by the robot commensurate with optimum trajectory motion of the tool along the path between different product pick and place positions of the tool in the palletizer.

It should be understood that the foregoing description is only illustrative of the aspects of the present disclosure. Various alternatives and modifications can be devised by those skilled in the art without departing from the aspects of the present disclosure. Accordingly, the aspects of the present disclosure are intended to embrace all such alternatives, modifications and variances that fall within the scope of any claims appended hereto. Further, the mere fact that different features are recited in mutually different dependent or independent claims does not indicate that a combination of these features cannot be advantageously used, such a combination remaining within the scope of the aspects of the present disclosure.

What is claimed is:

1. A tool for palletizing mixed load products, the tool comprising:

a frame for mounting the tool to a robot;

a support assembly movably coupled to the frame, the support assembly having a support member forming a support surface disposed in a predetermined reference orientation so as to support thereon a product seated on the support surface; and a gripping assembly mounted to the frame with an actuator and a grip press operably coupled to the actuator so as to move the grip press relative to the frame in an actuation direction opposite the support surface so as to clamp the product between the support surface in the predetermined reference orientation and the grip press;

wherein a coupling of the support assembly, coupling the support assembly to the frame, has a configuration fixing the support member relative to the frame in the actuation direction with the support surface in the predetermined reference orientation and that is movably released in at least another direction so that the support member is movable relative to the frame so that the support surface moves substantially freely away from the predetermined reference orientation.

2. The tool of claim 1, wherein at least the another direction is a released direction, wherein the support surface moves substantially freely in the released direction by contact of an object against the support member in a contact direction aligned at least in part with the released direction, which contact of the object against the support member is generated by relative motion between the support member and the object.

3. The tool of claim 2, wherein contact between the support member and the object that effects movement of the support surface substantially freely is generated through palletizing motion of the robot moving the tool.

4. The tool of claim 2, wherein the object is:

the product or a different product disposed at least at one of a product pick station, that holds the product for picking by the tool, and a portion of a palletizer cell; or a structure from at least one of a structure of a product pick station, that holds the product for picking by the tool, a structure of a palletizer cell, and a structure seated on at least part of the palletizer cell.

5. The tool of claim 1, wherein the another direction is oriented substantially against the actuation direction.

6. The tool of claim 1, wherein the support assembly coupling has a movably released configuration so that the support member is movable substantially freely relative to the frame in at least the another direction with the gripping assembly in a condition other than clamped wherein the product is gripped by the support surface and the grip press.

7. The tool of claim 1, wherein the gripping assembly has a position compliance device disposed so that the grip press actuation to clamp the product between the support surface and the grip press is compliant to a displaced position of the support surface away from the predetermined reference orientation.

8. The tool of claim 1, further comprising:

a pusher assembly including a pusher that is mounted to the frame for longitudinal movement along the support member; and a pusher actuator that has position compliance.

9. The tool of claim 1, wherein the support assembly coupling has a pivot disposed between the support member and the frame that defines the motion release of the support assembly coupling so that the support member is movable relative to the frame in the another direction.

10. The tool of claim 1, wherein the support assembly has a support base dependent from the frame and the support member is dependent and projects from the support base and is connected to the frame by the support base.

11. The tool of claim 10, wherein the support member is removably joined to the support base with a sliding joint configured so that the support member and support base slide relative to each other and the support member is joined and dis-joined to the support base by relative sliding between the support member and the support base.

12. A tool for palletizing mixed load products, the tool comprising:

a frame for mounting the tool to a robot;

a support assembly movably coupled to the frame, the support assembly having a support member forming a support surface disposed in a predetermined reference orientation so as to support thereon a product seated on the support surface; and a gripping assembly mounted to the frame with an actuator and a grip press operably coupled to the actuator so as to move the grip press relative to the frame in an actuation direction opposite the support surface so as to grip the product between the support surface in the predetermined reference orientation and the grip press;

wherein a coupling of the support assembly, coupling the support assembly to the frame, is positionally deterministic so that the support assembly coupling deterministically positions the support member in the actuation direction in a predetermined position with the support surface at the predetermined reference orientation relative to the frame, and that is movably released in a released direction different than the actuation direction so that the support member is substantially freely movable relative to the frame in the released direction away from the predetermined position.

13. The tool of claim 12, further comprising:

a pusher assembly including a pusher that is mounted to the frame for longitudinal movement along the support member; and a pusher actuator that has position compliance.

14. The tool of claim 12, wherein the support assembly has a support base dependent from the frame and the support member is dependent and projects from the support base and is connected to the frame by the support base.

15. The tool of claim 14, wherein the support member is removably joined to support base with a sliding joint configured so that the support member and support base slide relative to each other and the support member is joined and dis-joined to the support base by relative sliding between the support member and the support base.

16. The tool of claim 15, wherein the support member is removably joined to the support base by a slot joint that defines a guideway interface between the support base and the support member so that the support base and the support member slide relative to each other effecting coupling and decoupling of the support member and the support base to each other.

17. The tool of claim 16, wherein the guideway interface has a reference datum disposed so as to define the predetermined reference orientation of the support surface substantially coincident with joining of the support member and the support base.

18. The tool of claim 16, wherein the guideway interface defines a running clearance between the support member and the support base so the support member and the support base slide substantially free relative to each other in coupling and decoupling.

19. The tool of claim 16, wherein the guideway interface has an orientation in a direction athwart the released direction with the support assembly coupling fixing the support surface in the predetermined reference orientation, and the support assembly coupling has a pivot to reorient the guideway interface down at least in part.

20. A tool for palletizing mixed load products, the tool comprising:

a frame for mounting the tool to a robot;

a support assembly having a support member movably coupled to the frame via a compliant coupling, and forming a support surface disposed in a predetermined reference orientation so as to support thereon a product seated on the support surface; and a gripping assembly mounted to the frame with an actuator and a grip press operably coupled to the actuator so as to move the grip press relative to the frame in an actuation direction opposite the support surface so as to grip the product between the support surface in the predetermined reference orientation and the grip press;

wherein the compliant coupling is compliant in a compliance direction so that the support member is compliant and movable relative to the frame in the compliance direction, and wherein the compliant coupling is positionally deterministic so as to deterministically position the support member in the actuation direction in a predetermined position with the support surface at the predetermined reference orientation relative to the frame.

21. The tool of claim 20, wherein the compliance direction is different than the actuation direction, and the compliant coupling is configured so that compliance of the support member moves the support surface relative to the frame in the compliance direction away from the predetermined position.

22. The tool of claim 20, wherein the compliant coupling is configured so that the support member is compliant independent of whether the tool is in a gripping condition, wherein the product is gripped by the support surface and the grip press, and an ungripping condition.

23. The tool of claim 20, wherein the gripping assembly has a position conformance device disposed so that the grip press actuation, so as to grip the product between the support surface and the grip press, is conformal to a displaced position of the support surface, the displaced position of the support surface being away from the predetermined reference orientation.

24. The tool of claim 23, wherein the position conformance device is a torque limiting device.

25. The tool of claim 20, wherein at least the compliance direction is a released direction, wherein the support surface moves substantially freely in the released direction by contact of an object against the support member in a contact direction aligned at least in part with the released direction, which contact of the object against the support member is generated by relative motion between the support member and the object.

* * * * *